(12) United States Patent
Fei et al.

(10) Patent No.: US 8,160,960 B1
(45) Date of Patent: Apr. 17, 2012

(54) SYSTEM AND METHOD FOR RAPID UPDATING OF CREDIT INFORMATION

(75) Inventors: Huchen Fei, Newark, DE (US); Dong Yang, Newark, DE (US); Xiao Hong, Hockessin, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 12/636,398

(22) Filed: Dec. 11, 2009

Related U.S. Application Data

(63) Continuation of application No. 10/163,301, filed on Jun. 7, 2002, now Pat. No. 7,689,506.

(60) Provisional application No. 60/296,135, filed on Jun. 7, 2001.

(51) Int. Cl.
*G06Q 40/00* (2012.01)

(52) U.S. Cl. ............................................. 705/39; 705/41

(58) Field of Classification Search ............... 705/39–41
See application file for complete search history.

(56) References Cited

U.S. PATENT DOCUMENTS

| | | | |
|---|---|---|---|
| 2,005,003 A | 6/1935 | Patton et al. | |
| 2,405,500 A | 8/1946 | Guanella | |
| 3,665,162 A | 5/1972 | Yamamoto et al. | |
| 3,705,385 A | 12/1972 | Batz | |
| 3,860,870 A | 1/1975 | Furuya | |
| 3,896,266 A | 7/1975 | Waterbury | |
| 3,938,090 A | 2/1976 | Borison et al. | |
| 3,938,091 A | 2/1976 | Atalla et al. | |
| 4,013,962 A | 3/1977 | Beseke et al. | |
| 4,123,747 A | 10/1978 | Lancto et al. | |
| 4,160,120 A | 7/1979 | Barnes et al. | |
| 4,200,770 A | 4/1980 | Hellman et al. | |
| 4,223,403 A | 9/1980 | Konheim et al. | |
| 4,249,180 A | 2/1981 | Eberle et al. | |
| 4,255,811 A | 3/1981 | Adler | |
| 4,302,810 A | 11/1981 | Bouricius et al. | |

(Continued)

FOREIGN PATENT DOCUMENTS

CA    2430549    6/2002

(Continued)

OTHER PUBLICATIONS

Alshawi et. al., An IFC Web Based Collaborative Construction Computer Environment: Wisper, Proceedings of the International Construction IT Conference, Sep. 1999.

(Continued)

*Primary Examiner* — Hani M Kazimi
(74) *Attorney, Agent, or Firm* — Hunton & Williams LLP

(57) ABSTRACT

According to one embodiment, the invention relates to a system and method for evaluating the creditworthiness of an account holder of a credit account comprising the steps of determining, at least once a day, whether a first data set relating to the creditworthiness of the account holder has been received from a credit reporting organization; determining, at least once a day, whether a second data set relating to transaction activity of the credit account has been received; periodically receiving from a credit reporting organization a third data set relating to the creditworthiness of the account holder; periodically receiving a fourth data set relating to the historical activity of the credit account; and using the first and second data sets, to the extent they have been received, and the third and fourth data sets to determine a measure of creditworthiness.

17 Claims, 6 Drawing Sheets

U.S. PATENT DOCUMENTS

| | | |
|---|---|---|
| 4,316,055 A | 2/1982 | Feistel |
| 4,319,336 A | 3/1982 | Andersen et al. |
| 4,321,672 A | 3/1982 | Braun et al. |
| 4,405,829 A | 9/1983 | Rivest et al. |
| 4,453,074 A | 6/1984 | Weinstein |
| 4,454,414 A | 6/1984 | Benton |
| 4,471,164 A | 9/1984 | Henry |
| 4,523,087 A | 6/1985 | Benton |
| 4,529,870 A | 7/1985 | Chaum |
| 4,567,359 A | 1/1986 | Lockwood |
| 4,575,621 A | 3/1986 | Dreifus |
| 4,605,820 A | 8/1986 | Campbell, Jr. |
| 4,605,844 A | 8/1986 | Haggan |
| 4,614,861 A | 9/1986 | Pavlov et al. |
| 4,633,397 A | 12/1986 | Macco |
| 4,641,239 A | 2/1987 | Takesako |
| 4,650,981 A | 3/1987 | Foletta |
| 4,661,658 A | 4/1987 | Matyas |
| 4,663,500 A | 5/1987 | Okamoto et al. |
| 4,695,880 A | 9/1987 | Johnson et al. |
| 4,696,491 A | 9/1987 | Stenger |
| 4,697,072 A | 9/1987 | Kawana |
| 4,701,601 A | 10/1987 | Francini et al. |
| 4,713,760 A | 12/1987 | Yamada et al. |
| 4,713,761 A | 12/1987 | Sharpe et al. |
| 4,723,246 A | 2/1988 | Weldon, Jr. |
| 4,725,719 A | 2/1988 | Oncken et al. |
| 4,745,468 A | 5/1988 | Von Kohorn |
| 4,747,050 A | 5/1988 | Brachtl et al. |
| 4,747,139 A | 5/1988 | Taaffe |
| 4,752,676 A | 6/1988 | Leonard et al. |
| 4,799,156 A | 1/1989 | Shavit |
| 4,801,787 A | 1/1989 | Suzuki |
| 4,823,264 A | 4/1989 | Deming |
| 4,845,347 A | 7/1989 | McCrindle |
| 4,859,837 A | 8/1989 | Halpern |
| 4,868,877 A | 9/1989 | Fischer |
| 4,877,947 A | 10/1989 | Mori |
| 4,882,675 A | 11/1989 | Nichtberger et al. |
| 4,890,324 A | 12/1989 | Jansen |
| 4,891,503 A | 1/1990 | Jewell |
| 4,926,255 A | 5/1990 | Von Kohorn |
| 4,941,090 A | 7/1990 | McCarthy |
| 4,964,043 A | 10/1990 | Galvin |
| 4,965,568 A | 10/1990 | Atalla et al. |
| 4,977,501 A | 12/1990 | Lefevre |
| 4,980,913 A | 12/1990 | Skret |
| 4,984,272 A | 1/1991 | McIlroy et al. |
| 4,992,940 A | 2/1991 | Dworkin |
| 5,001,755 A | 3/1991 | Skret |
| 5,005,200 A | 4/1991 | Fischer |
| 5,016,270 A | 5/1991 | Katz |
| 5,016,274 A | 5/1991 | Mical et al. |
| 5,018,196 A | 5/1991 | Takaragi et al. |
| 5,023,782 A | 6/1991 | Lutz et al. |
| 5,025,372 A | 6/1991 | Burton et al. |
| 5,050,207 A | 9/1991 | Hitchcock |
| 5,054,067 A | 10/1991 | Moroney et al. |
| 5,056,019 A | 10/1991 | Schultz et al. |
| 5,072,380 A | 12/1991 | Randelman et al. |
| 5,084,816 A | 1/1992 | Boese |
| 5,097,115 A | 3/1992 | Ogasawara et al. |
| 5,117,355 A | 5/1992 | McCarthy |
| 5,122,950 A | 6/1992 | Mee et al. |
| 5,157,717 A | 10/1992 | Hitchcock |
| 5,161,244 A | 11/1992 | Maurer |
| 5,163,098 A | 11/1992 | Dahbura |
| 5,175,682 A | 12/1992 | Higashiyama |
| 5,189,606 A | 2/1993 | Burns et al. |
| 5,196,840 A | 3/1993 | Leith et al. |
| 5,202,826 A | 4/1993 | McCarthy |
| 5,212,792 A | 5/1993 | Gerety et al. |
| 5,220,501 A | 6/1993 | Lawlor |
| 5,225,664 A | 7/1993 | Iijima |
| 5,231,569 A | 7/1993 | Myatt et al. |
| 5,231,668 A | 7/1993 | Kravitz |
| 5,233,654 A | 8/1993 | Harvey et al. |
| 5,235,509 A | 8/1993 | Mueller et al. |
| 5,237,620 A | 8/1993 | Deaton |
| 5,241,594 A | 8/1993 | Kung |
| 5,253,294 A | 10/1993 | Maurer |
| 5,257,486 A | 11/1993 | Holmwall |
| 5,265,008 A | 11/1993 | Benton et al. |
| 5,265,033 A | 11/1993 | Vajk |
| 5,267,314 A | 11/1993 | Stambler |
| 5,276,311 A | 1/1994 | Hennige |
| 5,287,268 A | 2/1994 | McCarthy |
| 5,297,026 A | 3/1994 | Hoffman |
| 5,302,810 A | 4/1994 | Gauthier et al. |
| 5,305,456 A | 4/1994 | Boitana |
| 5,311,594 A | 5/1994 | Penzias |
| 5,315,504 A | 5/1994 | Lembie |
| 5,317,683 A | 5/1994 | Hager et al. |
| 5,319,710 A | 6/1994 | Atalla et al. |
| 5,321,841 A | 6/1994 | East |
| 5,341,428 A | 8/1994 | Schatz |
| 5,351,186 A | 9/1994 | Bullock |
| 5,351,187 A | 9/1994 | Hassett |
| 5,352,877 A | 10/1994 | Morley |
| 5,367,572 A | 11/1994 | Weiss |
| 5,381,332 A | 1/1995 | Wood |
| 5,382,784 A | 1/1995 | Eberhardt |
| 5,412,708 A | 5/1995 | Katz |
| 5,412,730 A | 5/1995 | Jones |
| 5,420,405 A | 5/1995 | Chasek |
| 5,424,938 A | 6/1995 | Wagner |
| 5,428,684 A | 6/1995 | Akiyama et al. |
| 5,430,644 A | 7/1995 | Deaton et al. |
| 5,432,326 A | 7/1995 | Noblett et al. |
| 5,446,740 A | 8/1995 | Yien |
| 5,448,471 A | 9/1995 | Deaton et al. |
| 5,450,134 A | 9/1995 | Legate |
| 5,450,491 A | 9/1995 | McNair |
| 5,450,537 A | 9/1995 | Hirai et al. |
| 5,465,206 A | 11/1995 | Hilt et al. |
| 5,466,920 A | 11/1995 | Nair et al. |
| 5,467,269 A | 11/1995 | Flaten |
| 5,469,576 A | 11/1995 | Dauerer et al. |
| 5,473,143 A | 12/1995 | Vak |
| 5,473,732 A | 12/1995 | Change |
| 5,479,530 A | 12/1995 | Nair et al. |
| 5,483,444 A | 1/1996 | Heintzeman et al. |
| 5,485,370 A | 1/1996 | Moss et al. |
| 5,495,981 A | 3/1996 | Warther |
| 5,500,890 A | 3/1996 | Rogge et al. |
| 5,502,636 A | 3/1996 | Clarke |
| 5,511,117 A | 4/1996 | Zazzera |
| 5,513,102 A | 4/1996 | Auriemma |
| 5,524,073 A | 6/1996 | Stambler |
| 5,532,689 A | 7/1996 | Bueno |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,539,825 A | 7/1996 | Akiyama et al. |
| 5,541,583 A | 7/1996 | Mandelbaum |
| 5,544,086 A | 8/1996 | Davis et al. |
| 5,546,452 A | 8/1996 | Andrews |
| 5,550,734 A | 8/1996 | Tater |
| 5,551,021 A | 8/1996 | Harada |
| 5,555,303 A | 9/1996 | Stambler |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,583,933 A | 12/1996 | Mark |
| 5,590,038 A | 12/1996 | Pitroda |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |

| Patent | Date | Inventor |
|---|---|---|
| 5,598,557 A | 1/1997 | Doner |
| 5,602,936 A | 2/1997 | Green et al. |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,615,277 A | 3/1997 | Hoffman |
| 5,617,474 A | 4/1997 | Ditzig et al. |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,493 A | 7/1997 | Motai |
| 5,644,723 A | 7/1997 | Deaton et al. |
| 5,644,778 A | 7/1997 | Burks et al. |
| 5,646,998 A | 7/1997 | Stambler |
| 5,649,114 A | 7/1997 | Deaton et al. |
| 5,652,786 A | 7/1997 | Rogers |
| 5,653,914 A | 8/1997 | Holmes et al. |
| 5,657,383 A | 8/1997 | Gerber |
| 5,657,390 A | 8/1997 | Elgamal |
| 5,659,165 A | 8/1997 | Jennings et al. |
| 5,659,469 A | 8/1997 | Deaton et al. |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,521 A | 10/1997 | Garrou |
| 5,677,955 A | 10/1997 | Doggett et al. |
| 5,678,046 A | 10/1997 | Cahill et al. |
| 5,680,459 A | 10/1997 | Hook et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,124 A | 11/1997 | Holden et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,706,452 A | 1/1998 | Ivanov |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,423 A | 3/1998 | Khello |
| 5,724,424 A | 3/1998 | Gifford |
| 5,727,163 A | 3/1998 | Bezos |
| 5,734,838 A | 3/1998 | Robinson et al. |
| 5,737,414 A | 4/1998 | Walker et al. |
| 5,740,231 A | 4/1998 | Cohn et al. |
| 5,742,845 A | 4/1998 | Wagner |
| 5,745,555 A | 4/1998 | Mark |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,770 A | 6/1998 | Schipper et al. |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez |
| 5,789,732 A | 8/1998 | McMahon et al. |
| 5,790,650 A | 8/1998 | Dunn |
| 5,790,785 A | 8/1998 | Klug et al. |
| 5,793,302 A | 8/1998 | Stambler |
| 5,793,861 A | 8/1998 | Haigh |
| 5,794,178 A | 8/1998 | Caid |
| 5,794,207 A | 8/1998 | Walker et al. |
| 5,794,221 A | 8/1998 | Egendorf |
| 5,794,259 A | 8/1998 | Kikinis |
| 5,796,395 A | 8/1998 | De Hond |
| 5,796,827 A | 8/1998 | Coppersmith et al. |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,003 A | 10/1998 | Jennings et al. |
| 5,825,863 A | 10/1998 | Walker |
| 5,825,870 A | 10/1998 | Miloslavsky |
| 5,825,871 A | 10/1998 | Mark |
| 5,825,890 A | 10/1998 | Elgamal et al. |
| 5,826,023 A | 10/1998 | Hall et al. |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,090 A | 11/1998 | Raspotnik |
| 5,832,211 A | 11/1998 | Blakley, III et al. |
| 5,832,457 A | 11/1998 | O'Brien |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,812 A | 11/1998 | Pare et al. |
| 5,838,903 A | 11/1998 | Blakely, III et al. |
| 5,838,906 A | 11/1998 | Doyle |
| 5,841,869 A | 11/1998 | Merkling et al. |
| 5,842,178 A | 11/1998 | Giovannoli |
| 5,842,211 A | 11/1998 | Horadan |
| 5,842,421 A | 12/1998 | Desilets et al. |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,190 A | 12/1998 | Kleehammer et al. |
| 5,848,400 A | 12/1998 | Chang |
| 5,848,427 A | 12/1998 | Hyodo |
| 5,852,811 A | 12/1998 | Atkins |
| 5,852,812 A | 12/1998 | Reeder |
| 5,857,023 A | 1/1999 | Demers et al. |
| 5,857,079 A | 1/1999 | Claus et al. |
| 5,859,419 A | 1/1999 | Wynn |
| 5,861,906 A | 1/1999 | Dunn et al. |
| 5,862,223 A | 1/1999 | Walker |
| 5,862,323 A | 1/1999 | Blakely, III et al. |
| 5,864,830 A | 1/1999 | Armetta et al. |
| 5,864,871 A | 1/1999 | Kitain et al. |
| RE36,116 E | 2/1999 | McCarthy |
| 5,866,889 A | 2/1999 | Weiss et al. |
| 5,870,456 A | 2/1999 | Rogers |
| 5,870,718 A | 2/1999 | Spector |
| 5,870,721 A | 2/1999 | Norris |
| 5,870,724 A | 2/1999 | Lawlor |
| 5,870,725 A | 2/1999 | Bellinger et al. |
| 5,871,398 A | 2/1999 | Schneier et al. |

| Patent | Date | Inventor |
|---|---|---|
| 5,873,072 A | 2/1999 | Kight |
| 5,873,096 A | 2/1999 | Lim |
| 5,875,296 A | 2/1999 | Shi et al. |
| 5,878,141 A | 3/1999 | Daly et al. |
| 5,878,403 A | 3/1999 | DeFrancesco et al. |
| 5,878,405 A | 3/1999 | Grant et al. |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,884,312 A | 3/1999 | Dustan et al. |
| 5,889,863 A | 3/1999 | Weber |
| 5,892,900 A | 4/1999 | Ginter et al. |
| 5,898,780 A | 4/1999 | Liu et al. |
| 5,898,838 A | 4/1999 | Wagner |
| 5,899,982 A | 5/1999 | Randle |
| 5,903,878 A | 5/1999 | Talati et al. |
| 5,903,881 A | 5/1999 | Schrader |
| 5,905,908 A | 5/1999 | Wagner |
| 5,907,142 A | 5/1999 | Kelsey |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,552 A | 7/1999 | Brown et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,812 A | 8/1999 | Meyer et al. |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,936,541 A | 8/1999 | Stambler |
| 5,940,811 A | 8/1999 | Norris |
| 5,940,812 A | 8/1999 | Tengel et al. |
| 5,940,843 A | 8/1999 | Zucknovich et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,647 A | 10/1999 | Downing et al. |
| 5,963,915 A | 10/1999 | Kirsch |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,480 A | 10/1999 | Kalina |
| 5,970,482 A | 10/1999 | Pham |
| 5,970,483 A | 10/1999 | Evans |
| 5,974,148 A | 10/1999 | Stambler |
| 5,978,467 A | 11/1999 | Walker et al. |
| 5,982,370 A | 11/1999 | Kamper |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,740 A | 11/1999 | Messer |
| 5,991,748 A | 11/1999 | Taskett |
| 5,991,751 A | 11/1999 | Rivette et al. |
| 5,991,780 A | 11/1999 | Rivette |
| 5,991,878 A | 11/1999 | McDonough et al. |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 5,999,971 A | 12/1999 | Buckland |
| 6,000,033 A | 12/1999 | Kelly et al. |
| 6,000,832 A | 12/1999 | Franklin et al. |
| 6,001,016 A | 12/1999 | Walker et al. |
| 6,003,762 A | 12/1999 | Hayashida |
| 6,005,939 A | 12/1999 | Fortenberry et al. |
| 6,005,943 A | 12/1999 | Cohen et al. |
| 6,006,205 A | 12/1999 | Loeb et al. |
| 6,006,249 A | 12/1999 | Leong |
| 6,009,411 A | 12/1999 | Kepecs |
| 6,009,415 A | 12/1999 | Shurling et al. |
| 6,009,442 A | 12/1999 | Chen et al. |
| 6,010,404 A | 1/2000 | Walker et al. |
| 6,012,049 A | 1/2000 | Kawan |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,029,141 A | 2/2000 | Bezos et al. |
| 6,029,149 A | 2/2000 | Dykstra et al. |
| 6,029,153 A | 2/2000 | Bauchner et al. |
| 6,029,890 A | 2/2000 | Austin |
| 6,032,134 A | 2/2000 | Weissman |
| 6,032,136 A | 2/2000 | Brake, Jr. et al. |
| 6,032,147 A | 2/2000 | Williams et al. |
| 6,036,099 A | 3/2000 | Leighton |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,044,402 A | 3/2000 | Jacobson et al. |
| 6,045,039 A | 4/2000 | Stinson et al. |
| 6,047,268 A | 4/2000 | Bartoli et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,660 A | 5/2000 | Eggleston et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,067,531 A | 5/2000 | Hoyt et al. |
| 6,069,968 A | 5/2000 | Shaw et al. |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |

| | | | | | |
|---|---|---|---|---|---|
| 6,076,072 A | 6/2000 | Libman | 6,216,115 B1 | 4/2001 | Barrameda et al. |
| 6,081,790 A | 6/2000 | Rosen | 6,219,639 B1 | 4/2001 | Bakis et al. |
| 6,081,810 A | 6/2000 | Rosenzweig et al. | 6,219,706 B1 | 4/2001 | Fan |
| 6,081,900 A | 6/2000 | Subramaniam et al. | 6,222,914 B1 | 4/2001 | McMullin |
| 6,085,168 A | 7/2000 | Mori et al. | 6,223,168 B1 | 4/2001 | McGurl et al. |
| 6,088,444 A | 7/2000 | Walker et al. | 6,226,623 B1 | 5/2001 | Schein et al. |
| 6,088,451 A | 7/2000 | He et al. | 6,226,679 B1 | 5/2001 | Gupta |
| 6,088,683 A | 7/2000 | Jalili | 6,226,752 B1 | 5/2001 | Gupta et al. |
| 6,088,686 A | 7/2000 | Walker et al. | 6,227,447 B1 | 5/2001 | Campisano |
| 6,088,700 A | 7/2000 | Larsen et al. | 6,230,148 B1 | 5/2001 | Pare et al. |
| 6,091,817 A | 7/2000 | Bertina et al. | 6,243,688 B1 | 6/2001 | Kalina |
| 6,092,057 A | 7/2000 | Zimmermann et al. | 6,243,689 B1 | 6/2001 | Norton |
| 6,092,192 A | 7/2000 | Kanevsky et al. | 6,243,816 B1 | 6/2001 | Fang et al. |
| 6,092,196 A | 7/2000 | Reiche | 6,246,996 B1 | 6/2001 | Stein et al. |
| 6,095,412 A | 8/2000 | Bertina et al. | 6,253,327 B1 | 6/2001 | Zhang et al. |
| 6,098,070 A | 8/2000 | Maxwell | 6,253,328 B1 | 6/2001 | Smith, Jr. |
| 6,101,486 A | 8/2000 | Roberts et al. | 6,256,664 B1 | 7/2001 | Donoho et al. |
| 6,104,716 A | 8/2000 | Crichton et al. | 6,260,026 B1 | 7/2001 | Tomida et al. |
| 6,105,006 A | 8/2000 | Davis et al. | 6,266,648 B1 | 7/2001 | Baker, III |
| 6,105,007 A | 8/2000 | Norris | 6,266,683 B1 | 7/2001 | Yehuda et al. |
| 6,105,012 A | 8/2000 | Chang et al. | 6,267,292 B1 | 7/2001 | Walker et al. |
| 6,105,865 A | 8/2000 | Hardesty | 6,269,348 B1 | 7/2001 | Pare et al. |
| 6,108,642 A | 8/2000 | Findley | 6,275,944 B1 | 8/2001 | Kao et al. |
| 6,111,858 A | 8/2000 | Greaves et al. | 6,278,996 B1 | 8/2001 | Richardson et al. |
| 6,112,181 A | 8/2000 | Shear et al. | 6,289,322 B1 | 9/2001 | Kitchen et al. |
| 6,112,190 A | 8/2000 | Fletcher et al. | 6,289,324 B1 | 9/2001 | Kawan |
| 6,115,641 A | 9/2000 | Brown et al. | 6,292,786 B1 | 9/2001 | Deaton et al. |
| 6,115,642 A | 9/2000 | Brown et al. | 6,298,330 B1 | 10/2001 | Gardenswartz et al. |
| 6,115,690 A | 9/2000 | Wong | 6,298,356 B1 | 10/2001 | Jawahar et al. |
| 6,119,093 A | 9/2000 | Walker et al. | 6,301,567 B1 | 10/2001 | Leong et al. |
| 6,119,099 A | 9/2000 | Walker et al. | 6,308,273 B1 | 10/2001 | Goertzel et al. |
| 6,119,933 A | 9/2000 | Wong et al. | 6,308,274 B1 | 10/2001 | Swift |
| 6,128,599 A | 10/2000 | Walker et al. | 6,311,169 B2 | 10/2001 | Duhon |
| 6,128,602 A | 10/2000 | Northington et al. | 6,311,275 B1 | 10/2001 | Jin et al. |
| 6,131,810 A | 10/2000 | Weiss et al. | 6,315,195 B1 | 11/2001 | Ramachandran |
| 6,134,549 A | 10/2000 | Regnier et al. | 6,317,834 B1 | 11/2001 | Gennaro et al. |
| 6,134,592 A | 10/2000 | Montulli | 6,317,838 B1 | 11/2001 | Baize |
| 6,135,349 A | 10/2000 | Zirkel | 6,321,337 B1 | 11/2001 | Reshef et al. |
| 6,138,106 A | 10/2000 | Walker et al. | 6,324,524 B1 | 11/2001 | Lent et al. |
| 6,138,118 A | 10/2000 | Koppstein et al. | 6,327,573 B1 | 12/2001 | Walker et al. |
| 6,138,911 A | 10/2000 | Fredregill et al. | 6,327,575 B1 | 12/2001 | Katz |
| 6,141,651 A | 10/2000 | Riley et al. | 6,327,578 B1 | 12/2001 | Linehan |
| 6,141,666 A | 10/2000 | Tobin | 6,330,543 B1 | 12/2001 | Kepecs |
| 6,144,848 A | 11/2000 | Walsh et al. | 6,332,126 B1 | 12/2001 | Peirce et al. |
| 6,144,946 A | 11/2000 | Iwamura | 6,332,192 B1 | 12/2001 | Boroditsky et al. |
| 6,144,948 A | 11/2000 | Walker et al. | 6,334,108 B1 | 12/2001 | Deaton et al. |
| 6,145,086 A | 11/2000 | Bellemore et al. | 6,336,104 B1 | 1/2002 | Walker et al. |
| 6,148,293 A | 11/2000 | King | 6,339,423 B1 | 1/2002 | Sampson et al. |
| 6,151,584 A | 11/2000 | Papierniak et al. | 6,341,724 B2 | 1/2002 | Campisano |
| 6,154,750 A | 11/2000 | Roberge et al. | 6,343,279 B1 | 1/2002 | Bissonette et al. |
| 6,154,879 A | 11/2000 | Pare et al. | 6,343,323 B1 | 1/2002 | Kalpio et al. |
| 6,161,113 A | 12/2000 | Mora et al. | 6,345,261 B1 | 2/2002 | Feidelson |
| 6,161,182 A | 12/2000 | Nadooshan | 6,349,242 B2 | 2/2002 | Mahaffey |
| 6,163,771 A | 12/2000 | Walker et al. | 6,349,290 B1 | 2/2002 | Horowitz et al. |
| 6,164,533 A | 12/2000 | Barton | 6,349,336 B1 | 2/2002 | Sit et al. |
| 6,169,974 B1 | 1/2001 | Baumgartner et al. | 6,356,881 B1 | 3/2002 | Milch et al. |
| 6,170,011 B1 | 1/2001 | Beck et al. | 6,360,209 B1 | 3/2002 | Loeb et al. |
| 6,178,408 B1 | 1/2001 | Copple et al. | 6,360,250 B1 | 3/2002 | Anupam et al. |
| 6,178,511 B1 | 1/2001 | Cohen et al. | 6,360,254 B1 | 3/2002 | Linden et al. |
| 6,182,052 B1 | 1/2001 | Fulton et al. | 6,363,381 B1 | 3/2002 | Lee et al. |
| 6,182,059 B1 | 1/2001 | Angotti et al. | 6,366,682 B1 | 4/2002 | Hoffman et al. |
| 6,182,142 B1 | 1/2001 | Win et al. | 6,381,587 B1 | 4/2002 | Guzelsu |
| 6,182,220 B1 | 1/2001 | Chen et al. | 6,385,591 B1 | 5/2002 | Mankoff |
| 6,182,225 B1 | 1/2001 | Hagiuda et al. | 6,385,652 B1 | 5/2002 | Brown et al. |
| 6,188,309 B1 | 2/2001 | Levine | 6,401,125 B1 | 6/2002 | Makarios et al. |
| 6,189,029 B1 | 2/2001 | Fuerst | 6,401,206 B1 | 6/2002 | Khan et al. |
| 6,189,787 B1 | 2/2001 | Dorf | 6,401,211 B1 | 6/2002 | Brezak, Jr. et al. |
| 6,195,644 B1 | 2/2001 | Bowie | 6,404,866 B1 | 6/2002 | Hopper et al. |
| 6,199,077 B1 | 3/2001 | Inala et al. | 6,405,175 B1 | 6/2002 | Ng |
| 6,201,948 B1 | 3/2001 | Cook et al. | 6,405,181 B2 | 6/2002 | Lent et al. |
| 6,202,005 B1 | 3/2001 | Mahaffey | 6,408,389 B2 | 6/2002 | Grawrock et al. |
| 6,202,053 B1 | 3/2001 | Christiansen et al. | 6,409,080 B2 | 6/2002 | Kawagishi |
| 6,202,054 B1 | 3/2001 | Lawlor et al. | 6,411,933 B1 | 6/2002 | Maes et al. |
| 6,202,066 B1 | 3/2001 | Barkley | 6,411,947 B1 | 6/2002 | Rice et al. |
| 6,202,151 B1 | 3/2001 | Musgrave et al. | 6,418,457 B1 | 7/2002 | Schmidt et al. |
| 6,202,158 B1 | 3/2001 | Urano et al. | 6,421,768 B1 | 7/2002 | Purpura |
| 6,208,978 B1 | 3/2001 | Walker et al. | 6,424,947 B1 | 7/2002 | Tsuria et al. |
| 6,208,984 B1 | 3/2001 | Rosenthal | 6,424,949 B1 | 7/2002 | Deaton et al. |
| 6,213,391 B1 | 4/2001 | Lewis | 6,424,951 B1 | 7/2002 | Shurling et al. |

| Patent | Type | Date | Inventor |
|---|---|---|---|
| 6,434,534 | B1 | 8/2002 | Walker et al. |
| 6,438,219 | B1 | 8/2002 | Karau et al. |
| 6,438,594 | B1 | 8/2002 | Bowman-Amuah |
| 6,438,666 | B2 | 8/2002 | Cassagnol et al. |
| 6,446,053 | B1 | 9/2002 | Elliott |
| 6,446,111 | B1 | 9/2002 | Lowery |
| 6,449,765 | B1 | 9/2002 | Ballard |
| 6,453,353 | B1 | 9/2002 | Win et al. |
| 6,460,141 | B1 | 10/2002 | Olden |
| 6,470,357 | B1 | 10/2002 | Garcia, Jr. et al. |
| 6,484,149 | B1 | 11/2002 | Jammes |
| 6,487,641 | B1 | 11/2002 | Cusson et al. |
| 6,490,601 | B1 | 12/2002 | Markus et al. |
| 6,493,677 | B1 | 12/2002 | Von Rosen et al. |
| 6,493,685 | B1 | 12/2002 | Ensel et al. |
| 6,496,855 | B1 | 12/2002 | Hunt et al. |
| 6,496,936 | B1 | 12/2002 | French et al. |
| 6,498,657 | B1 | 12/2002 | Kuntz et al. |
| 6,505,773 | B1 | 1/2003 | Palmer et al. |
| 6,507,912 | B1 | 1/2003 | Matyas, Jr. et al. |
| 6,510,464 | B1 | 1/2003 | Grantges et al. |
| 6,510,523 | B1 | 1/2003 | Perlman et al. |
| 6,513,019 | B2 | 1/2003 | Lewis |
| 6,516,302 | B1 | 2/2003 | Deaton et al. |
| 6,516,416 | B2 | 2/2003 | Gregg et al. |
| 6,519,763 | B1 | 2/2003 | Kaufer et al. |
| 6,526,404 | B1 | 2/2003 | Slater et al. |
| 6,532,284 | B2 | 3/2003 | Walker et al. |
| 6,535,855 | B1 | 3/2003 | Cahill et al. |
| 6,535,917 | B1 | 3/2003 | Zamanzadeh et al. |
| 6,535,980 | B1 | 3/2003 | Kumar et al. |
| 6,539,027 | B1 | 3/2003 | Cambron |
| 6,539,363 | B1 | 3/2003 | Allgeier et al. |
| 6,539,424 | B1 | 3/2003 | Dutta |
| 6,546,392 | B1 | 4/2003 | Bahlmann |
| 6,549,972 | B1 | 4/2003 | Berstis et al. |
| 6,557,039 | B1 | 4/2003 | Leong et al. |
| 6,560,581 | B1 | 5/2003 | Fox et al. |
| 6,564,189 | B1 | 5/2003 | Nycz |
| 6,567,791 | B2 | 5/2003 | Lent et al. |
| 6,571,216 | B1 | 5/2003 | Garg et al. |
| 6,574,348 | B1 | 6/2003 | Venkatesan et al. |
| 6,578,012 | B1 | 6/2003 | Storey |
| 6,580,814 | B1 | 6/2003 | Ittycheriah et al. |
| 6,581,040 | B1 | 6/2003 | Wright et al. |
| 6,584,505 | B1 | 6/2003 | Howard et al. |
| 6,584,508 | B1 | 6/2003 | Epstein et al. |
| 6,587,835 | B1 | 7/2003 | Treyz et al. |
| 6,589,291 | B1 | 7/2003 | Boag et al. |
| 6,592,044 | B1 | 7/2003 | Wong et al. |
| 6,594,640 | B1 | 7/2003 | Postrel |
| 6,607,127 | B2 | 8/2003 | Wong |
| 6,609,104 | B1 | 8/2003 | Deaton et al. |
| 6,609,106 | B1 | 8/2003 | Robertson |
| 6,609,113 | B1 | 8/2003 | O'Leary et al. |
| 6,609,125 | B1 | 8/2003 | Layne et al. |
| 6,609,198 | B1 | 8/2003 | Wood et al. |
| 6,609,654 | B1 | 8/2003 | Anderson et al. |
| 6,611,498 | B1 | 8/2003 | Baker et al. |
| 6,611,811 | B1 | 8/2003 | Deaton et al. |
| 6,611,819 | B1 | 8/2003 | Oneda |
| 6,618,579 | B1 | 9/2003 | Smith et al. |
| 6,618,806 | B1 | 9/2003 | Brown et al. |
| 6,623,415 | B2 | 9/2003 | Gates et al. |
| 6,624,761 | B2 | 9/2003 | Fallon |
| 6,631,849 | B2 | 10/2003 | Blossom |
| 6,640,302 | B1 | 10/2003 | Subramaniam et al. |
| 6,641,050 | B2 | 11/2003 | Kelley et al. |
| 6,647,376 | B1 | 11/2003 | Farrar et al. |
| 6,651,168 | B1 | 11/2003 | Kao et al. |
| 6,662,215 | B1 | 12/2003 | Moskowitz et al. |
| 6,668,321 | B2 | 12/2003 | Nendell et al. |
| 6,668,322 | B1 | 12/2003 | Wood et al. |
| 6,671,818 | B1 | 12/2003 | Mikurak |
| 6,675,261 | B2 | 1/2004 | Shandony |
| 6,678,664 | B1 | 1/2004 | Ganesan |
| 6,684,195 | B1 | 1/2004 | Deaton et al. |
| 6,684,212 | B1 | 1/2004 | Day et al. |
| 6,684,248 | B1 | 1/2004 | Janacek et al. |
| 6,684,384 | B1 | 1/2004 | Bickerton et al. |
| 6,687,222 | B1 | 2/2004 | Albert et al. |
| 6,687,245 | B2 | 2/2004 | Fangman et al. |
| 6,697,947 | B1 | 2/2004 | Matyas, Jr. et al. |
| 6,714,919 | B1 | 3/2004 | Findley |
| 6,714,987 | B1 | 3/2004 | Amin et al. |
| 6,718,313 | B1 | 4/2004 | Lent et al. |
| 6,718,482 | B2 | 4/2004 | Sato et al. |
| 6,718,535 | B1 | 4/2004 | Underwood |
| 6,721,743 | B1 | 4/2004 | Sakakibara |
| 6,725,269 | B1 | 4/2004 | Megiddo |
| 6,727,802 | B2 | 4/2004 | Kelly et al. |
| 6,735,695 | B1 | 5/2004 | Gopalakrishnan et al. |
| 6,735,778 | B2 | 5/2004 | Khoo et al. |
| 6,738,779 | B1 | 5/2004 | Shapira |
| D490,840 | S | 6/2004 | Arakaki et al. |
| D491,186 | S | 6/2004 | Arakaki et al. |
| D491,953 | S | 6/2004 | Arakaki et al. |
| 6,751,654 | B2 | 6/2004 | Massarani et al. |
| 6,754,640 | B2 | 6/2004 | Bozeman |
| 6,754,833 | B1 | 6/2004 | Black et al. |
| 6,755,341 | B1 | 6/2004 | Wong et al. |
| 6,763,388 | B1 | 7/2004 | Tsimelzon |
| 6,766,370 | B2 | 7/2004 | Glommen et al. |
| 6,769,605 | B1 | 8/2004 | Magness |
| 6,772,146 | B2 | 8/2004 | Khemlani et al. |
| 6,775,783 | B1 | 8/2004 | Trostle |
| 6,785,810 | B1 | 8/2004 | Lirov et al. |
| D496,365 | S | 9/2004 | Liu et al. |
| 6,789,115 | B1 | 9/2004 | Singer et al. |
| 6,792,572 | B1 | 9/2004 | Frohlick |
| 6,795,809 | B2 | 9/2004 | O'Brien et al. |
| 6,795,812 | B1 | 9/2004 | Lent et al. |
| 6,804,786 | B1 | 10/2004 | Chamley et al. |
| 6,805,288 | B2 | 10/2004 | Routhenstein et al. |
| 6,807,285 | B1 | 10/2004 | Iwamura |
| 6,810,395 | B1 | 10/2004 | Bharat |
| D498,236 | S | 11/2004 | Liu et al. |
| 6,817,008 | B2 | 11/2004 | Leford et al. |
| 6,817,521 | B1 | 11/2004 | Matada |
| 6,819,219 | B1 | 11/2004 | Bolle et al. |
| 6,820,061 | B2 | 11/2004 | Postrel |
| 6,820,202 | B1 | 11/2004 | Wheeler et al. |
| 6,826,696 | B1 | 11/2004 | Chawla et al. |
| 6,829,586 | B2 | 12/2004 | Postrel |
| 6,832,202 | B1 | 12/2004 | Schuyler et al. |
| 6,832,587 | B2 | 12/2004 | Wampula et al. |
| 6,842,739 | B2 | 1/2005 | Postrel |
| 6,847,991 | B1 | 1/2005 | Kurapati |
| 6,856,970 | B1 | 2/2005 | Campbell et al. |
| RE38,717 | E | 3/2005 | Bothwell |
| 6,865,547 | B1 | 3/2005 | Brake, Jr. et al. |
| 6,868,391 | B1 | 3/2005 | Hultgren |
| 6,874,139 | B2 | 3/2005 | Krueger et al. |
| 6,889,198 | B2 | 5/2005 | Kawan |
| 6,892,231 | B2 | 5/2005 | Jager |
| 6,901,375 | B2 | 5/2005 | Fernandez |
| 6,901,406 | B2 | 5/2005 | Nabe et al. |
| 6,907,566 | B1 | 6/2005 | McElfresh et al. |
| 6,912,315 | B1 | 6/2005 | Wong et al. |
| 6,912,529 | B1 | 6/2005 | Kolfman |
| 6,915,271 | B1 | 7/2005 | Meyer et al. |
| 6,920,611 | B1 | 7/2005 | Spaeth et al. |
| 6,925,441 | B1 | 8/2005 | Jones, III et al. |
| 6,925,481 | B2 | 8/2005 | Singhal et al. |
| 6,931,382 | B2 | 8/2005 | Laage et al. |
| 6,934,848 | B1 | 8/2005 | King et al. |
| 6,937,976 | B2 | 8/2005 | Apte |
| 6,938,020 | B2 | 8/2005 | Nakayama |
| 6,938,048 | B1 | 8/2005 | Jilk et al. |
| 6,938,156 | B2 | 8/2005 | Wheeler et al. |
| 6,938,158 | B2 | 8/2005 | Azuma |
| RE38,801 | E | 9/2005 | Rogers |
| 6,947,897 | B2 | 9/2005 | Lortscher et al. |
| 6,947,898 | B2 | 9/2005 | Postrel |
| 6,950,826 | B1 | 9/2005 | Freeman |
| 6,950,881 | B1 | 9/2005 | Ndili |
| 6,950,936 | B2 | 9/2005 | Subramaniam et al. |
| 6,950,940 | B2 | 9/2005 | Wheeler et al. |

| | | |
|---|---|---|
| 6,954,932 B2 | 10/2005 | Nakamura et al. |
| 6,957,337 B1 | 10/2005 | Chainer et al. |
| 6,963,857 B1 | 11/2005 | Johnson |
| 6,965,939 B2 | 11/2005 | Cuomo et al. |
| 6,970,830 B1 | 11/2005 | Samra et al. |
| 6,976,067 B2 | 12/2005 | Gusler et al. |
| 6,976,164 B1 | 12/2005 | King et al. |
| 6,978,378 B1 | 12/2005 | Koretz |
| 6,980,962 B1 | 12/2005 | Arganbright et al. |
| 6,983,421 B1 | 1/2006 | Lahti et al. |
| 6,985,879 B2 | 1/2006 | Walker et al. |
| 6,992,786 B1 | 1/2006 | Breding et al. |
| 6,999,938 B1 | 2/2006 | Libman |
| 7,003,476 B1 | 2/2006 | Samra et al. |
| 7,003,565 B2 | 2/2006 | Hind et al. |
| 7,006,979 B1 | 2/2006 | Samra et al. |
| 7,006,983 B1 | 2/2006 | Packes et al. |
| 7,010,495 B1 | 3/2006 | Samra et al. |
| 7,010,512 B1 | 3/2006 | Gillin et al. |
| 7,013,286 B1 | 3/2006 | Aggarwal et al. |
| 7,020,696 B1 | 3/2006 | Perry et al. |
| 7,024,374 B1 | 4/2006 | Day et al. |
| 7,032,110 B1 | 4/2006 | Su et al. |
| 7,039,714 B1 | 5/2006 | Blakley III et al. |
| 7,043,455 B1 | 5/2006 | Cuomo et al. |
| 7,047,222 B1 | 5/2006 | Bush |
| 7,051,199 B1 | 5/2006 | Berson et al. |
| 7,051,330 B1 | 5/2006 | Kaler et al. |
| 7,051,929 B2 | 5/2006 | Li |
| 7,058,817 B1 | 6/2006 | Ellmore |
| 7,069,434 B1 | 6/2006 | Ilnicki et al. |
| 7,072,864 B2 | 7/2006 | Brake, Jr. et al. |
| 7,073,059 B2 | 7/2006 | Worely, Jr. et al. |
| 7,076,453 B2 | 7/2006 | Jammes et al. |
| 7,080,036 B1 | 7/2006 | Drummond et al. |
| 7,089,203 B1 | 8/2006 | Crookshanks |
| 7,089,208 B1 | 8/2006 | Levchin et al. |
| 7,089,503 B1 | 8/2006 | Bloomquist et al. |
| 7,089,585 B1 | 8/2006 | Dharmarajan |
| 7,090,138 B2 | 8/2006 | Rettenmyer et al. |
| 7,092,905 B2 | 8/2006 | Behrenbrinker et al. |
| 7,092,992 B1 | 8/2006 | Yu |
| 7,093,020 B1 | 8/2006 | McCarty et al. |
| 7,093,282 B1 | 8/2006 | Hillhouse |
| 7,103,556 B2 | 9/2006 | Del Rey et al. |
| 7,110,962 B2 | 9/2006 | Amon et al. |
| 7,117,239 B1 | 10/2006 | Hansen |
| 7,121,471 B2 | 10/2006 | Beenau et al. |
| 7,124,101 B1 | 10/2006 | Mikurak |
| 7,134,075 B2 | 11/2006 | Hind |
| 7,137,006 B1 | 11/2006 | Grandcolas et al. |
| 7,139,686 B1 | 11/2006 | Critz |
| 7,143,063 B2 | 11/2006 | Lent et al. |
| 7,152,242 B2 | 12/2006 | Douglas |
| 7,155,402 B1 | 12/2006 | Dvorak |
| 7,155,477 B2 | 12/2006 | Blair et al. |
| 7,161,506 B2 | 1/2007 | Fallon |
| 7,163,153 B2 | 1/2007 | Blossom |
| 7,165,256 B2 | 1/2007 | Boudnik et al. |
| 7,177,830 B2 | 2/2007 | Shields et al. |
| 7,185,094 B2 | 2/2007 | Marquette et al. |
| 7,188,181 B1 | 3/2007 | Squier et al. |
| 7,191,952 B2 | 3/2007 | Blossom |
| 7,195,154 B2 | 3/2007 | Routhenstein |
| 7,197,470 B1 | 3/2007 | Arnett |
| 7,203,909 B1 | 4/2007 | Horvitz et al. |
| 7,225,249 B1 | 5/2007 | Barry et al. |
| 7,225,462 B2 | 5/2007 | Bass et al. |
| 7,225,464 B2 | 5/2007 | Satyavolu et al. |
| 7,228,155 B2 | 6/2007 | Saunders |
| 7,249,097 B2 | 7/2007 | Hutchison et al. |
| 7,249,099 B2 | 7/2007 | Ling |
| 7,249,112 B2 | 7/2007 | Berardi et al. |
| 7,266,835 B2 | 9/2007 | Halbert |
| 7,299,201 B2 | 11/2007 | Jammes |
| 7,302,585 B1 | 11/2007 | Proudler et al. |
| 7,312,707 B1 | 12/2007 | Bishop et al. |
| 7,313,802 B1 | 12/2007 | Tomsen |
| 7,321,864 B1 | 1/2008 | Gendler |
| 7,333,948 B2 | 2/2008 | Bell et al. |
| 7,340,773 B2 | 3/2008 | Edwards |
| 7,349,866 B2 | 3/2008 | Schwarz, Jr. |
| 7,356,516 B2 | 4/2008 | Richey et al. |
| 7,357,331 B2 | 4/2008 | Blossom |
| 7,370,011 B2 | 5/2008 | Bennett |
| 7,389,256 B1 | 6/2008 | Adams et al. |
| 7,395,241 B1 | 7/2008 | Cook et al. |
| 7,400,274 B2 | 7/2008 | Fallon et al. |
| 7,417,568 B2 | 8/2008 | Fallon et al. |
| 7,426,530 B1 | 9/2008 | Rosko et al. |
| 7,440,923 B1 | 10/2008 | Compiano |
| 7,444,672 B2 | 10/2008 | Ellmore |
| 7,467,096 B2 | 12/2008 | Antonucci et al. |
| 7,472,171 B2 | 12/2008 | Miller et al. |
| 7,485,040 B2 | 2/2009 | Walker et al. |
| 7,490,064 B2 | 2/2009 | Allin et al. |
| 7,493,288 B2 | 2/2009 | Biship et al. |
| 7,493,636 B2 | 2/2009 | Kitsukawa et al. |
| 7,496,950 B2 | 2/2009 | Carley |
| 7,506,804 B2 | 3/2009 | Zajkowski et al. |
| 7,506,806 B2 | 3/2009 | Bonalle et al. |
| 7,512,551 B2 | 3/2009 | Postrel |
| 7,523,385 B2 | 4/2009 | Nguyen et al. |
| 7,539,635 B1 | 5/2009 | Peak et al. |
| 7,545,931 B2 | 6/2009 | Dillaway |
| 7,549,170 B2 | 6/2009 | Stubblefield et al. |
| 7,580,857 B2 | 8/2009 | VanFleet et al. |
| 7,581,112 B2 | 8/2009 | Brown et al. |
| 7,587,363 B2 | 9/2009 | Cataline et al. |
| 7,599,856 B2 | 10/2009 | Agrawal et al. |
| 7,613,629 B2 | 11/2009 | Antonucci et al. |
| 7,630,935 B2 | 12/2009 | Loeger et al. |
| 7,640,205 B2 | 12/2009 | Michelassi et al. |
| 7,640,321 B2 | 12/2009 | Yabe et al. |
| 7,686,218 B2 | 3/2010 | Hessburg et al. |
| 7,689,504 B2 | 3/2010 | Warren et al. |
| 7,689,506 B2 | 3/2010 | Fei et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 7,747,866 B1 | 6/2010 | Everhart |
| 2001/0002487 A1 | 5/2001 | Grawrock et al. |
| 2001/0011250 A1 | 8/2001 | Paltenghe et al. |
| 2001/0011255 A1 | 8/2001 | Asay et al. |
| 2001/0012974 A1 | 8/2001 | Mahaffey |
| 2001/0016835 A1 | 8/2001 | Hansmann et al. |
| 2001/0023407 A1 | 9/2001 | Liyanearachchi et al. |
| 2001/0025253 A1 | 9/2001 | Heintz et al. |
| 2001/0027441 A1 | 10/2001 | Wankmueller |
| 2001/0027474 A1 | 10/2001 | Nachman et al. |
| 2001/0029464 A1 | 10/2001 | Schweitzwer |
| 2001/0029490 A1 | 10/2001 | Inamochi |
| 2001/0032183 A1 | 10/2001 | Landry |
| 2001/0032184 A1 | 10/2001 | Tenembaum |
| 2001/0032312 A1 | 10/2001 | Runje et al. |
| 2001/0034651 A1 | 10/2001 | Marks et al. |
| 2001/0034663 A1 | 10/2001 | Teveler et al. |
| 2001/0034718 A1 | 10/2001 | Shaked et al. |
| 2001/0034720 A1 | 10/2001 | Armes |
| 2001/0037243 A1 | 11/2001 | Rouston et al. |
| 2001/0037299 A1 | 11/2001 | Nichols et al. |
| 2001/0038033 A1 | 11/2001 | Habib |
| 2001/0039511 A1 | 11/2001 | Duckworth et al. |
| 2001/0044764 A1 | 11/2001 | Arnold |
| 2001/0047295 A1 | 11/2001 | Tenembaum |
| 2001/0047315 A1 | 11/2001 | Siegel |
| 2001/0047342 A1 | 11/2001 | Cuervo |
| 2001/0049628 A1 | 12/2001 | Icho |
| 2001/0051917 A1 | 12/2001 | Bissonette et al. |
| 2001/0054003 A1 | 12/2001 | Chien et al. |
| 2001/0054059 A1 | 12/2001 | Marks et al. |
| 2001/0055391 A1 | 12/2001 | Jacobs |
| 2002/0002479 A1 | 1/2002 | Almog et al. |
| 2002/0002495 A1 | 1/2002 | Ullman |
| 2002/0002597 A1 | 1/2002 | Morrell |
| 2002/0004742 A1 | 1/2002 | Willcocks et al. |
| 2002/0007313 A1 | 1/2002 | Mai et al. |
| 2002/0007460 A1 | 1/2002 | Azuma |

| | | | | | | |
|---|---|---|---|---|---|---|
| 2002/0010599 A1 | 1/2002 | Levison | | 2002/0128977 A1 | 9/2002 | Nambiar et al. |
| 2002/0010621 A1 | 1/2002 | Bell et al. | | 2002/0133401 A1 | 9/2002 | Mount et al. |
| 2002/0010627 A1 | 1/2002 | Lerat | | 2002/0143614 A1 | 10/2002 | MacLean et al. |
| 2002/0010668 A1 | 1/2002 | Travis et al. | | 2002/0143621 A1 | 10/2002 | Donnelly et al. |
| 2002/0011517 A1 | 1/2002 | Namekawa et al. | | 2002/0143626 A1 | 10/2002 | Voltmer et al. |
| 2002/0018585 A1 | 2/2002 | Kim | | 2002/0143874 A1 | 10/2002 | Marquette et al. |
| 2002/0019938 A1 | 2/2002 | Aarons | | 2002/0147633 A1 | 10/2002 | Rafizadeh |
| 2002/0023108 A1 | 2/2002 | Daswani et al. | | 2002/0147691 A1 | 10/2002 | Davis et al. |
| 2002/0026365 A1 | 2/2002 | Natanzon | | 2002/0152116 A1 | 10/2002 | Yan et al. |
| 2002/0029269 A1 | 3/2002 | McCarty et al. | | 2002/0152118 A1 | 10/2002 | Hadjigeorgis |
| 2002/0031230 A1 | 3/2002 | Sweet et al. | | 2002/0152123 A1 | 10/2002 | Giordano et al. |
| 2002/0032613 A1 | 3/2002 | Buettgenbach et al. | | 2002/0152163 A1 | 10/2002 | Bezos et al. |
| 2002/0032622 A1 | 3/2002 | Petit et al. | | 2002/0152179 A1 | 10/2002 | Racov |
| 2002/0032642 A1 | 3/2002 | Chichilnisky | | 2002/0156900 A1 | 10/2002 | Marquette et al. |
| 2002/0032650 A1 | 3/2002 | Hauser et al. | | 2002/0161630 A1 | 10/2002 | Kern et al. |
| 2002/0032724 A1 | 3/2002 | Shibusawa et al. | | 2002/0161641 A1 | 10/2002 | Quinlan et al. |
| 2002/0040344 A1 | 4/2002 | Preiser et al. | | 2002/0165808 A1 | 11/2002 | Zamsky et al. |
| 2002/0042742 A1 | 4/2002 | Glover et al. | | 2002/0165949 A1 | 11/2002 | Na |
| 2002/0042774 A1 | 4/2002 | Ortiz et al. | | 2002/0169671 A1 | 11/2002 | Junger |
| 2002/0042808 A1 | 4/2002 | Smith et al. | | 2002/0174010 A1 | 11/2002 | Rice, III |
| 2002/0046106 A1 | 4/2002 | Ishibashi et al. | | 2002/0174011 A1 | 11/2002 | Sanchez et al. |
| 2002/0046110 A1 | 4/2002 | Gallagher | | 2002/0178056 A1 | 11/2002 | Lim |
| 2002/0046116 A1 | 4/2002 | Hohle et al. | | 2002/0178112 A1 | 11/2002 | Goeller et al. |
| 2002/0049605 A1 | 4/2002 | Hagi | | 2002/0178113 A1 | 11/2002 | Clifford et al. |
| 2002/0052778 A1 | 5/2002 | Murphy et al. | | 2002/0178213 A1 | 11/2002 | Parry |
| 2002/0055874 A1 | 5/2002 | Cohen | | 2002/0184507 A1 | 12/2002 | Makower et al. |
| 2002/0059103 A1 | 5/2002 | Anderson et al. | | 2002/0188478 A1 | 12/2002 | Breeland et al. |
| 2002/0059141 A1 | 5/2002 | Davies et al. | | 2002/0188509 A1 | 12/2002 | Ariff et al. |
| 2002/0059345 A1 | 5/2002 | Wang et al. | | 2002/0188511 A1 | 12/2002 | Johnson et al. |
| 2002/0062253 A1 | 5/2002 | Dosh et al. | | 2002/0188565 A1 | 12/2002 | Nakamura et al. |
| 2002/0062257 A1 | 5/2002 | Minamishin et al. | | 2002/0188869 A1 | 12/2002 | Patrick |
| 2002/0065735 A1 | 5/2002 | Hatakama et al. | | 2002/0191548 A1 | 12/2002 | Ylonen et al. |
| 2002/0069104 A1 | 6/2002 | Beach et al. | | 2002/0194071 A1 | 12/2002 | Yoshizaki et al. |
| 2002/0069105 A1 | 6/2002 | do Rosario Botelho | | 2002/0194119 A1 | 12/2002 | Wright et al. |
| 2002/0069109 A1 | 6/2002 | Wendkos | | 2002/0198803 A1 | 12/2002 | Rowe |
| 2002/0069158 A1 | 6/2002 | Larkin et al. | | 2002/0198806 A1 | 12/2002 | Blagg et al. |
| 2002/0069172 A1 | 6/2002 | Omshehe et al. | | 2002/0198807 A1 | 12/2002 | Kobayashi et al. |
| 2002/0070270 A1 | 6/2002 | Narita et al. | | 2003/0001888 A1 | 1/2003 | Power |
| 2002/0072931 A1 | 6/2002 | Card | | 2003/0004794 A1 | 1/2003 | Hamilton |
| 2002/0072974 A1 | 6/2002 | Pugliese et al. | | 2003/0004803 A1 | 1/2003 | Glover et al. |
| 2002/0072984 A1 | 6/2002 | Rothman et al. | | 2003/0004809 A1 | 1/2003 | Palcic et al. |
| 2002/0073019 A1 | 6/2002 | Deaton | | 2003/0005288 A1 | 1/2003 | Moskowitz et al. |
| 2002/0077890 A1 | 6/2002 | LaPointe et al. | | 2003/0009374 A1 | 1/2003 | Moodie et al. |
| 2002/0077895 A1 | 6/2002 | Howell | | 2003/0009379 A1 | 1/2003 | Narasimhan et al. |
| 2002/0077904 A1 | 6/2002 | Ali | | 2003/0009393 A1 | 1/2003 | Norris |
| 2002/0077964 A1* | 6/2002 | Brody et al. ............... 705/38 | | 2003/0009426 A1 | 1/2003 | Ruiz-Sanchez |
| 2002/0077966 A1 | 6/2002 | Harycki et al. | | 2003/0018523 A1 | 1/2003 | Rappaport et al. |
| 2002/0077978 A1 | 6/2002 | O'Leary et al. | | 2003/0018915 A1 | 1/2003 | Stoll |
| 2002/0078382 A1 | 6/2002 | Sheikh et al. | | 2003/0023557 A1 | 1/2003 | Moore |
| 2002/0082920 A1 | 6/2002 | Austin et al. | | 2003/0023880 A1 | 1/2003 | Edwards et al. |
| 2002/0082962 A1 | 6/2002 | Farris et al. | | 2003/0033252 A1 | 2/2003 | Buttridge et al. |
| 2002/0087349 A1 | 7/2002 | Wong | | 2003/0034388 A1 | 2/2003 | Routhenstein et al. |
| 2002/0087447 A1 | 7/2002 | McDonald et al. | | 2003/0036952 A1 | 2/2003 | Panttaja et al. |
| 2002/0087471 A1 | 7/2002 | Ganesan et al. | | 2003/0037131 A1 | 2/2003 | Verma |
| 2002/0091567 A1 | 7/2002 | Royston | | 2003/0037142 A1 | 2/2003 | Munger et al. |
| 2002/0095443 A1 | 7/2002 | Kovack | | 2003/0040964 A1 | 2/2003 | Lacek |
| 2002/0099601 A1 | 7/2002 | Farrell | | 2003/0040995 A1 | 2/2003 | Daddario et al. |
| 2002/0099649 A1 | 7/2002 | Lee et al. | | 2003/0041165 A1 | 2/2003 | Spencer et al. |
| 2002/0099826 A1 | 7/2002 | Summers et al. | | 2003/0046173 A1 | 3/2003 | Benjier et al. |
| 2002/0099936 A1 | 7/2002 | Kou et al. | | 2003/0046587 A1 | 3/2003 | Bheemarasetti et al. |
| 2002/0104006 A1 | 8/2002 | Boate et al. | | 2003/0046589 A1 | 3/2003 | Gregg |
| 2002/0104017 A1 | 8/2002 | Stefan | | 2003/0048888 A1 | 3/2003 | Hopper et al. |
| 2002/0107731 A1 | 8/2002 | Teng | | 2003/0050831 A1 | 3/2003 | Klayh |
| 2002/0107788 A1 | 8/2002 | Cunningham | | 2003/0051026 A1 | 3/2003 | Carter et al. |
| 2002/0111859 A1 | 8/2002 | Sheldon et al. | | 2003/0055871 A1 | 3/2003 | Roses |
| 2002/0111860 A1 | 8/2002 | Jones | | 2003/0061093 A1 | 3/2003 | Todd |
| 2002/0111861 A1 | 8/2002 | Sakamoto et al. | | 2003/0061097 A1 | 3/2003 | Walker et al. |
| 2002/0111890 A1 | 8/2002 | Sloan et al. | | 2003/0061098 A1 | 3/2003 | Meyer |
| 2002/0111891 A1 | 8/2002 | Hoffman et al. | | 2003/0061168 A1 | 3/2003 | Routhenstein |
| 2002/0116266 A1 | 8/2002 | Marshall | | 2003/0065618 A1 | 4/2003 | VanDeBoe, Jr. |
| 2002/0116331 A1 | 8/2002 | Cataline et al. | | 2003/0069808 A1 | 4/2003 | Cardno |
| 2002/0120497 A1 | 8/2002 | King | | 2003/0070069 A1 | 4/2003 | Belapurkar et al. |
| 2002/0120571 A1 | 8/2002 | Maung et al. | | 2003/0070084 A1 | 4/2003 | Satomaa et al. |
| 2002/0120846 A1 | 8/2002 | Stewart et al. | | 2003/0074580 A1 | 4/2003 | Knouse et al. |
| 2002/0123926 A1 | 9/2002 | Bushold et al. | | 2003/0079147 A1 | 4/2003 | Hsieh et al. |
| 2002/0123946 A1 | 9/2002 | Haworth et al. | | 2003/0083933 A1 | 5/2003 | McAlear |
| 2002/0123955 A1 | 9/2002 | Andreski et al. | | 2003/0083939 A1 | 5/2003 | Wohl |
| 2002/0128903 A1 | 9/2002 | Kernahan | | 2003/0084002 A1 | 5/2003 | Ericson et al. |
| 2002/0128916 A1 | 9/2002 | Beinecke | | 2003/0084345 A1 | 5/2003 | Bjornestad et al. |

| | | | | | | |
|---|---|---|---|---|---|---|
| 2003/0084647 A1 | 5/2003 | Smith et al. | | 2004/0094624 A1 | 5/2004 | Fernandes et al. |
| 2003/0085286 A1 | 5/2003 | Kelley et al. | | 2004/0111363 A1 | 6/2004 | Trench et al. |
| 2003/0088462 A1 | 5/2003 | Carrither et al. | | 2004/0111371 A1 | 6/2004 | Friedman |
| 2003/0088470 A1 | 5/2003 | Cuervo | | 2004/0111610 A1 | 6/2004 | Slick et al. |
| 2003/0088489 A1 | 5/2003 | Peters et al. | | 2004/0117409 A1 | 6/2004 | Scahill et al. |
| 2003/0088552 A1 | 5/2003 | Bennett et al. | | 2004/0117658 A1 | 6/2004 | Klaes |
| 2003/0097298 A1 | 5/2003 | Klimpl et al. | | 2004/0122736 A1 | 6/2004 | Strock et al. |
| 2003/0097574 A1 | 5/2003 | Upton | | 2004/0122766 A1 | 6/2004 | Brooks et al. |
| 2003/0101454 A1 | 5/2003 | Ozer et al. | | 2004/0128248 A1 | 7/2004 | Fujihara et al. |
| 2003/0105688 A1 | 6/2003 | Brown et al. | | 2004/0133787 A1 | 7/2004 | Doughty et al. |
| 2003/0105689 A1 | 6/2003 | Chandak et al. | | 2004/0138991 A1 | 7/2004 | Song et al. |
| 2003/0105981 A1 | 6/2003 | Miller et al. | | 2004/0143526 A1 | 7/2004 | Monasterio et al. |
| 2003/0110399 A1 | 6/2003 | Rail | | 2004/0146159 A1 | 7/2004 | Rosen |
| 2003/0115100 A1 | 6/2003 | Teicher | | 2004/0149544 A1 | 8/2004 | Dal Ferro |
| 2003/0115160 A1 | 6/2003 | Nowlin et al. | | 2004/0153378 A1 | 8/2004 | Perkowski |
| 2003/0119642 A1 | 6/2003 | Gates et al. | | 2004/0159700 A1 | 8/2004 | Khan et al. |
| 2003/0120544 A1 | 6/2003 | Gritzbach et al. | | 2004/0162773 A1 | 8/2004 | Del Rey et al. |
| 2003/0125969 A1 | 7/2003 | Kizer et al. | | 2004/0172358 A1 | 9/2004 | Lent et al. |
| 2003/0126011 A1 | 7/2003 | Bryman et al. | | 2004/0177036 A1 | 9/2004 | Nutahara et al. |
| 2003/0131357 A1 | 7/2003 | Kim | | 2004/0181441 A1 | 9/2004 | Fung et al. |
| 2003/0144902 A1 | 7/2003 | Bowie | | 2004/0186773 A1 | 9/2004 | George et al. |
| 2003/0149594 A1 | 8/2003 | Beazley et al. | | 2004/0193540 A1 | 9/2004 | Brown et al. |
| 2003/0149629 A1 | 8/2003 | Claridge et al. | | 2004/0199406 A1 | 10/2004 | Owens et al. |
| 2003/0149756 A1 | 8/2003 | Grieve et al. | | 2004/0210498 A1 | 10/2004 | Freund |
| 2003/0154171 A1 | 8/2003 | Karp et al. | | 2004/0210531 A1 | 10/2004 | Barron et al. |
| 2003/0154403 A1 | 8/2003 | Keinsley et al. | | 2004/0215507 A1 | 10/2004 | Levitt et al. |
| 2003/0158776 A1 | 8/2003 | Landesmann | | 2004/0215514 A1 | 10/2004 | Quinlan et al. |
| 2003/0158782 A1 | 8/2003 | Thomson et al. | | 2004/0225880 A1 | 11/2004 | Mizrah |
| 2003/0158818 A1 | 8/2003 | George et al. | | 2004/0230843 A1 | 11/2004 | Jansen |
| 2003/0159072 A1 | 8/2003 | Bellinger et al. | | 2004/0232223 A1 | 11/2004 | Beenau et al. |
| 2003/0163700 A1 | 8/2003 | Paatero | | 2004/0236688 A1 | 11/2004 | Bozeman |
| 2003/0163733 A1 | 8/2003 | Barriga-Caceres et al. | | 2004/0239481 A1 | 12/2004 | Beenau et al. |
| 2003/0167199 A1 | 9/2003 | Thomann et al. | | 2004/0243468 A1 | 12/2004 | Cohagan et al. |
| 2003/0167229 A1 | 9/2003 | Ludwig et al. | | 2004/0243506 A1 | 12/2004 | Das |
| 2003/0171992 A1 | 9/2003 | Blagg et al. | | 2004/0249689 A1 | 12/2004 | Naraki et al. |
| 2003/0177067 A1 | 9/2003 | Cowell et al. | | 2004/0249710 A1 | 12/2004 | Smith et al. |
| 2003/0182246 A1 | 9/2003 | Johnson et al. | | 2004/0249712 A1 | 12/2004 | Brown et al. |
| 2003/0187787 A1 | 10/2003 | Freund | | 2004/0249764 A1 | 12/2004 | Delitz et al. |
| 2003/0191549 A1 | 10/2003 | Otsuka et al. | | 2004/0252012 A1 | 12/2004 | Beenau et al. |
| 2003/0195805 A1 | 10/2003 | Storey | | 2004/0254991 A1 | 12/2004 | Malik et al. |
| 2003/0200141 A1 | 10/2003 | Robison | | 2005/0004839 A1 | 1/2005 | Bakker et al. |
| 2003/0200142 A1 | 10/2003 | Hicks et al. | | 2005/0004864 A1 | 1/2005 | Lent et al. |
| 2003/0204460 A1 | 10/2003 | Robinson et al. | | 2005/0006286 A1 | 1/2005 | Fery et al. |
| 2003/0205617 A1 | 11/2003 | Allen et al. | | 2005/0015490 A1 | 1/2005 | Saare et al. |
| 2003/0208400 A1 | 11/2003 | Kuo et al. | | 2005/0021363 A1 | 1/2005 | Stimson et al. |
| 2003/0208439 A1 | 11/2003 | Rast | | 2005/0021405 A1 | 1/2005 | Agarwal |
| 2003/0212630 A1 | 11/2003 | Kahr | | 2005/0021457 A1 | 1/2005 | Johnson et al. |
| 2003/0212887 A1 | 11/2003 | Walther et al. | | 2005/0023346 A1 | 2/2005 | Bakker et al. |
| 2003/0216964 A1 | 11/2003 | MacLean et al. | | 2005/0033619 A1 | 2/2005 | Barnes et al. |
| 2003/0216967 A1 | 11/2003 | Williams | | 2005/0033637 A1 | 2/2005 | Underwood |
| 2003/0216998 A1 | 11/2003 | Chang et al. | | 2005/0035847 A1 | 2/2005 | Bonalle et al. |
| 2003/0217003 A1 | 11/2003 | Weinflash et al. | | 2005/0040242 A1 | 2/2005 | Beenau et al. |
| 2003/0218066 A1 | 11/2003 | Fernandes et al. | | 2005/0049965 A1 | 3/2005 | Jen |
| 2003/0220834 A1 | 11/2003 | Leung et al. | | 2005/0055270 A1 | 3/2005 | Broe |
| 2003/0225618 A1 | 12/2003 | Hessburg et al. | | 2005/0055306 A1 | 3/2005 | Miller et al. |
| 2003/0225619 A1 | 12/2003 | Dokken et al. | | 2005/0060579 A1 | 3/2005 | Dickelman et al. |
| 2003/0225688 A1 | 12/2003 | Dobbins | | 2005/0065877 A1 | 3/2005 | Cleary et al. |
| 2003/0229590 A1 | 12/2003 | Byrne et al. | | 2005/0066037 A1 | 3/2005 | Song et al. |
| 2003/0233255 A1 | 12/2003 | Dirienzo | | 2005/0071225 A1 | 3/2005 | Bortolin et al. |
| 2003/0233278 A1 | 12/2003 | Marshall | | 2005/0071226 A1 | 3/2005 | Nguyen et al. |
| 2003/0236712 A1 | 12/2003 | Antonucci et al. | | 2005/0071227 A1 | 3/2005 | Hammad et al. |
| 2004/0002916 A1 | 1/2004 | Timmerman et al. | | 2005/0071637 A1 | 3/2005 | Shirakawa |
| 2004/0006487 A1 | 1/2004 | Tari | | 2005/0075889 A1 | 4/2005 | Gomes et al. |
| 2004/0010447 A1 | 1/2004 | Asayama | | 2005/0077349 A1 | 4/2005 | Bonalle et al. |
| 2004/0010462 A1 | 1/2004 | Moon et al. | | 2005/0080672 A1 | 4/2005 | Courtion et al. |
| 2004/0015394 A1 | 1/2004 | Mok et al. | | 2005/0080747 A1 | 4/2005 | Anderson et al. |
| 2004/0019563 A1 | 1/2004 | Sines et al. | | 2005/0082362 A1 | 4/2005 | Anderson et al. |
| 2004/0029569 A1 | 2/2004 | Khan et al. | | 2005/0086103 A1 | 4/2005 | Agura et al. |
| 2004/0031856 A1 | 2/2004 | Atsmon et al. | | 2005/0086160 A1 | 4/2005 | Wong et al. |
| 2004/0039686 A1 | 2/2004 | Klebanoff | | 2005/0086166 A1 | 4/2005 | Monk et al. |
| 2004/0039940 A1 | 2/2004 | Cox et al. | | 2005/0086177 A1 | 4/2005 | Anderson et al. |
| 2004/0044606 A1 | 3/2004 | Buttridge et al. | | 2005/0091104 A1 | 4/2005 | Abraham |
| 2004/0049702 A1 | 3/2004 | Subramaniam et al. | | 2005/0091126 A1 | 4/2005 | Junger |
| 2004/0054931 A1 | 3/2004 | Himmel et al. | | 2005/0091138 A1 | 4/2005 | Awatsu |
| 2004/0064401 A1 | 4/2004 | Palaghita et al. | | 2005/0091492 A1 | 4/2005 | Benson et al. |
| 2004/0078276 A1 | 4/2004 | Shimogori | | 2005/0096976 A1 | 5/2005 | Nelms |
| 2004/0078324 A1 | 4/2004 | Lonnberg et al. | | 2005/0097033 A1 | 5/2005 | Pretell et al. |
| 2004/0078328 A1 | 4/2004 | Talbert et al. | | 2005/0102178 A1 | 5/2005 | Phillips et al. |
| 2004/0078332 A1 | 4/2004 | Ferguson et al. | | 2005/0108090 A1 | 5/2005 | Takeda et al. |

| | | |
|---|---|---|
| 2005/0108102 A1 | 5/2005 | York |
| 2005/0108151 A1 | 5/2005 | York |
| 2005/0114254 A1 | 5/2005 | Condie |
| 2005/0119938 A1 | 6/2005 | Smith et al. |
| 2005/0120180 A1 | 6/2005 | Schornbach et al. |
| 2005/0125292 A1 | 6/2005 | Kassab et al. |
| 2005/0125295 A1 | 6/2005 | Tidwell et al. |
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131721 A1 | 6/2005 | Doctorow et al. |
| 2005/0131761 A1 | 6/2005 | Trika et al. |
| 2005/0131792 A1 | 6/2005 | Rowe |
| 2005/0137982 A1 | 6/2005 | Michelassi et al. |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullriede et al. |
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177523 A1 | 8/2005 | Weiss et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0192862 A1 | 9/2005 | Modi |
| 2005/0193056 A1 | 9/2005 | Schaefer et al. |
| 2005/0193208 A1 | 9/2005 | Charrette et al. |
| 2005/0197904 A1 | 9/2005 | Baron et al. |
| 2005/0198634 A1 | 9/2005 | Nielsen et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209917 A1 | 9/2005 | Anderson et al. |
| 2005/0216346 A1 | 9/2005 | Kusumoto et al. |
| 2005/0216421 A1 | 9/2005 | Barry et al. |
| 2005/0222906 A1 | 10/2005 | Chen |
| 2005/0234769 A1 | 10/2005 | Jain et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0240916 A1 | 10/2005 | Sandrew |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0278641 A1 | 12/2005 | Mansour et al. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289051 A1 | 12/2005 | Allin et al. |
| 2006/0004629 A1 | 1/2006 | Neemann et al. |
| 2006/0005039 A1 | 1/2006 | Hsieh |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020783 A1 | 1/2006 | Fisher |
| 2006/0026073 A1 | 2/2006 | Kenny et al. |
| 2006/0029261 A1 | 2/2006 | Hoffman et al. |
| 2006/0031718 A1 | 2/2006 | Thornhill et al. |
| 2006/0036553 A1 | 2/2006 | Gupta et al. |
| 2006/0041540 A1 | 2/2006 | Shannon et al. |
| 2006/0053056 A1 | 3/2006 | Alspach-Gross et al. |
| 2006/0064329 A1 | 3/2006 | Abolfathi et al. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0095350 A1 | 5/2006 | Hall et al. |
| 2006/0116949 A1 | 6/2006 | Wehunt et al. |
| 2006/0122943 A1 | 6/2006 | Mann, III et al. |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0161478 A1 | 7/2006 | Turner et al. |
| 2006/0173706 A1 | 8/2006 | Allin et al. |
| 2006/0249574 A1 | 11/2006 | Brown et al. |
| 2006/0259766 A1 | 11/2006 | Rasti |
| 2006/0261927 A1 | 11/2006 | Kelly et al. |
| 2006/0271397 A1 | 11/2006 | Allin et al. |
| 2006/0271477 A1 | 11/2006 | Allin et al. |
| 2006/0271478 A1 | 11/2006 | Allin et al. |
| 2006/0271479 A1 | 11/2006 | Allin et al. |
| 2006/0271480 A1 | 11/2006 | Allin et al. |
| 2006/0274970 A1 | 12/2006 | Seki et al. |
| 2007/0011089 A1 | 1/2007 | DeSchryver |
| 2007/0019806 A1 | 1/2007 | Conley et al. |
| 2007/0034700 A1 | 2/2007 | Poidomani et al. |
| 2007/0043681 A1 | 2/2007 | Morgan et al. |
| 2007/0078771 A1 | 4/2007 | Allin et al. |
| 2007/0088950 A1 | 4/2007 | Wheeler et al. |
| 2007/0136211 A1 | 6/2007 | Brown et al. |
| 2007/0156521 A1 | 7/2007 | Yates |
| 2007/0179883 A1 | 8/2007 | Questembert |
| 2007/0186252 A1 | 8/2007 | Maggio |
| 2007/0192618 A1 | 8/2007 | Ellmore |
| 2007/0203850 A1 | 8/2007 | Singh et al. |
| 2007/0208671 A1 | 9/2007 | Brown et al. |
| 2007/0215688 A1 | 9/2007 | Routhenstein |
| 2007/0234408 A1 | 10/2007 | Burch et al. |
| 2007/0234409 A1 | 10/2007 | Eisen |
| 2007/0265924 A1 | 11/2007 | Schwarz |
| 2007/0283436 A1 | 12/2007 | Duffield et al. |
| 2007/0295803 A1 | 12/2007 | Levine et al. |
| 2008/0010202 A1 | 1/2008 | Schwarz |
| 2008/0133350 A1 | 6/2008 | White et al. |
| 2008/0184315 A1 | 7/2008 | Ellis et al. |
| 2008/0262915 A1 | 10/2008 | Gojkovic et al. |
| 2008/0320567 A1 | 12/2008 | Shulman et al. |
| 2009/0043651 A1 | 2/2009 | Schwarz |
| 2009/0100508 A1 | 4/2009 | Labaton |
| 2009/0112639 A1 | 4/2009 | Robinson |
| 2009/0150937 A1 | 6/2009 | Ellis et al. |
| 2009/0171778 A1 | 7/2009 | Powell |
| 2009/0192940 A1 | 7/2009 | Mann, III et al. |
| 2009/0228362 A1 | 9/2009 | Lapsley et al. |
| 2009/0313110 A1 | 12/2009 | Asai et al. |
| 2010/0057551 A1 | 3/2010 | Blaisdell |
| 2010/0057553 A1 | 3/2010 | Ameiss et al. |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 | 6/2000 |
| EP | 1014318 A2 | 6/2000 |
| EP | 1022664 | 7/2000 |
| EP | 1056043 | 11/2000 |

| | | |
|---|---|---|
| EP | 0590861 | 1/2001 |
| EP | 1089516 | 4/2001 |
| JP | 359146347 A | 8/1984 |
| JP | 10187467 | 7/1998 |
| JP | 11078891 A | 3/1999 |
| JP | 2000-324329 | 11/2000 |
| JP | 2001-134672 | 5/2001 |
| JP | 2005-242976 | 9/2005 |
| WO | WO 97/43736 | 11/1997 |
| WO | WO 98/10368 | 3/1998 |
| WO | WO 98-29822 | 7/1998 |
| WO | WO 99/39291 | 8/1999 |
| WO | WO 99/40507 A1 | 8/1999 |
| WO | WO 99/52051 | 10/1999 |
| WO | WO 00/68858 | 11/2000 |
| WO | WO 01/11526 | 2/2001 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |
| WO | WO 2005/101975 | 11/2005 |
| WO | WO 2006/011904 A2 | 2/2006 |
| WO | WO 2006/011904 A3 | 2/2006 |
| WO | WO 2006/060370 | 6/2006 |
| WO | WO 2006/105092 | 10/2006 |
| WO | WO 2006/116772 | 11/2006 |

OTHER PUBLICATIONS

Aversion Therapy Banks Overcoming Fear of the 'Net.to Develop Safe Internet-based Payment System w/ Netscape Communicator, Network World, ISSN 0887-7661, Dec. 12, 1994.
CORBA Overview, arch2.htm at pent21.infosys.tuwien.ac.at, May 25, 1999, 14 pages.
Overview of CORBA, May 25, 1999, 4 pages.
Java, The Source for Java Technology, Applets, java.sun.com, May 21, 1999, 2 pages.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Bank, Cash, Check,Charge—What's Next?, Seattle Times, Mar. 6, 1995.
Barnham, Network Brings Together Producers and Companies, Bests Review, Feb. 1, 1994, Document ID 17347.
Bechtel Construction Operations Incorporated Standardizes on Primavera's Expedition Contract Management Software, Business Wire, Jul. 27, 1999.
Berry et al., A potent new tool for selling databse, Business Week, Cover Story, Sep. 5, 1994, pp. 56-62.
Brown, Keith, The Buiders Revolution, Internet Archive Wayback Machine, Jan. 1998.
Brown, The Builders Revolution, BuildNet Publishing Division, Jan. 1996, ISBN 096493390x.
Butterworth; 'Automating the Business Process of Mission Critical Distributed Applications'; Forte Software, Inc.; Apr. 1997.
Calyx Software, Point for Windows Version 3.x Interface Marketing Guide, Rev. Dec. 8, 1999, Copyright 1999.
Carden, Philip, The New Face of Single Sign-on, Network Computing, http//www.networkcomputing.com, printed Dec. 29, 2000, 4 pages.
Chester, Cross-platform integration with XML and SOAP, IT PTO Sep.-Oct. 2001.
Civitello Jr., Construction Operations Manual of Policies and Procedures, Third Edition, 2000.
Clark, Microsoft, Visa to Jointly Develop PC Electronic-Shopping Software, The Wall Street Journal, Nov. 9, 1994, WSJ B9.
Consortium Created to Manage Common Electronic Purse Specifications, http//www.visa.com/av/news/PRmisc051199.vhtml, printed Feb. 23, 2001.
Cotts, David, The Facility Management Handbook Second Edition AMACM, 1998, ISBN 0-8144-030-8.

Deckmyn, Dominique, San Francisco manages $45M project via web-based Service, Computerworld, Aug. 9, 1999, vol. 33, No. 32, p. 14.
Definition of 'Opt Out', Wiktionary, (http://en.wiktionary.org/wiki/opt_out), Aug. 18, 2008 (1 page).
eCharge Corporation, www.echarge.com, Dec. 3, 1999.
Epper, A Player Goes After Big Bucks in Cyberspace, American Banker, vol. 160, No. 86, ISSN 0002/7561, May 5, 1995, p. 17.
Frank, John N. Frank, Beyond Direct Mail, Credit Card Management, vol. 9, Iss. 5, Aug. 1996, 4pgs.
FreeMarkets, Interop Enterprise Award Winner for FreeMarkets Web Applications, Copyright 1999.
Friedman, Dictionary of Business Terms, Barron's Third Edition, Copyright 2000.
Fujimura et al., XML Voucher Generic Voucher Language, Feb. 2003.
Fusaro, Roberta, Builders Moving to Web tools Computerworld, Nov. 16, 1998, vol. 32, No. 46, pp. 51, 53.
Reuters, Getting Smart with Java Sun Micro Says American Express to Use Java for Smart Card, ABCNews.com, printed on Jun. 6, 2000.
Getting Started Specific GE TPN Post Service Use Guidelines, printed on Apr. 26, 1999.
Harris, Harris InfoSource, printed on Apr. 26, 1999.
Harris, Planning Using Primavera Project Planner P3 Version 3.0, User Guide, Copyright 1999 by Eastwood Harry Pty Ltd., 1999.
Hasting, Nelson et. al., A Case Study of Authenticated and Secure File Transfer The Iowa Campaign Finance Reporting System.
Hernandez, Tomas et al., Software Solutions Building Design & Construction, Nov. 1999, vol. 40, No. 11, pp. 38-40.
Hewlett-Packard Company, Understanding Product Data Management, Hewlett-Packard Company, Apr. 26, 1999.
Hiremath, Numerical Credit Scoring Model, Operations Research Bulletin, WA13.16, Apr. 30, 1975.
Houlder, OFT Gives the Individual Top Priority Report Calls for Deregulation of Business Lending, Document ID 91716, Jun. 8, 1994.
Jakobsson et al., Secure and lightweight advertising on the web, Computer Networks, 31 (1999) 1101-1109.
JAVA, Banking on JAVA(TM) Technology, java.sun.com, May 21, 1999.
JAVA, JAVA (TM) Technology in the Real World, java.sun.com, May 21, 1999.
JAVA, JAVA(TM) Remote Method Invocation (RMI) Interface, java.sun.com, May 21, 1999.
JAVA, JAVA(TM) Servlet API, java.sun.com, May 21, 1999.
JAVA, Staying in Touch with JNDI, java.sun.com, May 21, 1999.
JAVA, The JDBC(TM) Data Access API, java.sun.com, May 21, 1999.
Jepsen, SOAP Cleans up interoperability problems on the web, IT PTO, Jan./Feb. 2001.
Johnston, Pondering Passport Do You Trust Microsoft With Your Data?, www.pcworld.com/resource/printable/article/0.aid,63244,00.asp, Sep. 24, 2001.
Kilian-Kehr, Mobile Security with Smartcards, Dissertation, Apr. 8, 2002.
Knowles, Improved Internet Security Enabling On-Line Commerce, PCWeek, vol. 12, No. 11, ISSN 0740-1604, Mar. 20, 1995.
Kormann, Risks of the Passport Single Signon Protocol, Computer Networks, Elsevier Science Press, vol. 33, Sep. 20, 2003, pp. 51-58.
Kristol, Kristol, HTTP Cookies Standards, Privacy, and Politics, ACM Transactions on Internet Technology, vol. 1, No. 2,p. 151-198, Nov. 2001.
Kutler, A Different Drummer on the Data Highway, American Banker, Section No. 91, vol. 160, May 12, 1995, p. 14.
Kutler, Cash Card Creator Looking Beyond Mondex, Feb. 9, 1995.
Lacity, et al., The Information Systems Outsourcing Bandwagon, Sloan Management Review, vol. 35, No. 1, Fall 1993, p. 73-86.
Larsen, Amy, Internet goes to Work for Builders, InterWeek, Nov. 16, 1998, Issue 741.
Li et al., Combined Coherence and Prefetching Mechanisms for Effective Web Caching, IEEE, p. 3034-3038, 2001.
Maize, Fannie Mae on the Web, Doucment ID 52079, May 8, 1995.

Marchman, Construction Scheduling with Primavera Project Planner, May 25, 1999.
Marlin, Chasing Document Management, Inform, vol. 13, No. 4, Apr. 199, p. 76-82.
Meredith, Internet bank moves closer to virtual reality, USA Today, May 5, 1995.
Method of Protecting Data on A Personal Computer, IBM Corporation, TDB 11-85, Order 85A 62426, Nov. 1, 1995, p. 2530.
Microsoft, CNBC on MSN Money Microsoft Money 2003 Deluxe.
Mitchell, Cyberspace Crafting Software . . . , Business Week, Feb. 27, 1999, pp. 78-86.
Mitchell, Netlink Goes After an Unbanked Niche, Card Technology, ISSN 1093-1279, Sep. 1999, p. 22.
Mosig, Richard, Software Review the Construction Project Manager Cost Engineering, Jan. 1996, vol. 38, No. 1, pp. 7-8.
Muse Technologies, Leading the New Age of Perceptual Computing, Apr. 26, 1999.
Myers, The Wired World of Investment Information, Nation's Business, Washington, vol. 85, Iss. 3, p. 58, Mar. 1997.
Nelte et al., Cookies Weaving the Web into a State, Crossroads, vol. 7, Issue 1, ACM Press, 6 pages, Fall 2000.
Nowlin, Construction Financing to Build Your Own Home, First Edition, Jerry L. Nowlin Consulting, Inc., ISBN 0962864307, Jul. 1990.
OMG, Library, www.omg.com, May 25, 1999.
OMG, Welcome to OMG's CORBA for Beginners Page!, www.omg.co, May 25, 1999.
OMG, What is CORBA?, www.omg.com, May 25, 1999.
OMWARE, Inc., Web Pages, Feb. 2000, Retrieved from http//web.archive.org/web20000226033405/www.omware.com/products.html, Retrieved from the Internet on Nov. 28, 2005.
Owens, David, Facilities Planning & Relocation RSMeans, 1993, ISBN 0-87629-281-3.
Post, E-Cash Can't Live With It, Can't Live Without It, The American Lawyer, Mar. 1, 1995, pp. 116-117.
Primavera and PurchasePro.com to Create E-Commerce Marketplace for Construction Industry, Primavera Ships P3, version 3.0, www.purchasepro.com/, Sep. 21, 1999, pp. 1-3.
Primavera Systems Delivers Expedition Express, Business Wire, Feb. 23, 1999.
Primavera Systems, Inc.—How the World Manages Projects, Expedition Contract Control Software, www.primavera.com, Jun. 23, 2005.
Primavera Systems, Inc., Primavera Expedition User Guide, Version 6.0, Primavera Systems, Inc., 1998.
Product Data Integration Technologies, Inc., Step Integratin Authors, printed on Apr. 26, 1999.
Radosevich, Is Work Flow Working?, CNN.com, Apr. 6, 1999 at <http//www.cnn.com/TECH/computing/9904/06/workflow/ent.idg, p. 1 of 5, retrieved from the internet on Nov. 28, 2005.
Resource Center Consolidated Edison Selects GE TPN Post, printed Apr. 26, 1999.
Ritz, Total Construction Project Management, McGraw-Hill, 1994.
Safe Single-Sign-On Protocol with Minimal Password Exposure No Decryption and Technology Adaptivity, IBM Corporation, TDB Mar. 1995, Order 95A, Mar. 1, 1995, pp. 245-248.
SBA Pro-Net, U.S. Small Business Administration Procurement Marketing and Access Network, Last Modified Apr. 1, 1999.
Seibert, Paul, Facilities Planning & Design for Financial Institutions Bankline Publications, 1996, ISBN 1-55738-780-X.
Servlet/Applet/HTML Authentication Process with Single Sign-On, IBM Corporation, IBM Order 00A6004, Jan. 1, 2000.
Shibata, Seventh International Conference on Parallel and Distributed Systems Workshops, IEEE Computer Society, Jul. 4-7, 2000.
Siebel, Siebel Ensuring Customer Success, www.siebel.com, Nov. 17, 1999.
Sirbu, et al, NetBill An Internet Commerce System Optimized for Network Delivered Services, printed on Feb. 27, 1995.
SmartAxis, How it works, http//www.smartaxis.co.uk/seller/howitworks.html, printed on Feb. 23, 2001.
Strassel, Dutch Software Concern Experiments with Electronic 'Cash' in Cyberspace, The Wall Street Journal, Apr. 17, 1995.
Pletz et al., Summary of The At Your Request Architecture, First USA Bank Confidential and Proprietary, Apr. 2, 1999, pp. 1-8.
Sun Microsystems, Inc., Schema for Representing CORBA Objects in an LDAP directory, May 21, 1999, pp. 1-9.
Taylor, Telecommunications Demand Analysis in Transition, Proceedings of the 31st Hawaii International Conference on System Sciences, vol. 5, Jan. 6-9, 1998, pp. 409-415.
Temporary Global Passwords, IBM Corporation, IBM TDB v36, n3, Mar. 1993, Order 93A 60636, Mar. 1, 1993, pp. 451-454.
The Check is in the Email, Information Today, vol. 12, No. 3, ISSN 8755-6286, Mar. 1995.
The Gale Group, G&D America's Multi-application Smart Card Selected for Combined Payroll and 'Virtual Banking' Program in Mexico, Business Wire, Apr. 24, 1998, p. 241047.
Thomas Publishing Company, SoluSource for Engineers by Engineers, Thomas Publishing Company, Apr. 26, 1999.
Thomas Publishing Company, ThomasNet, Apr. 26, 1999.
Thomas, Enterprise JAVABEANS(TM) Technology Server Component Model for the Java(TM) platform, java.sun.com, May 2, 1999.
Van Collie, Problem Disbursement Control Needed Construction Loan Tool from PriMerit NewTrend, Bank Management, Apr. 1990.
Vandenengel, Cards on the Internet Advertising on a $3 Bill, Industry Intelligence, Feb. 1, 1995, pp. 46-48.
Yee, Using Secure Coprocessors, School of Computer Science Carnegie Mellon University, May 1994.
Youll, Peer to Peer Transactions in Agent Mediated Electronic Commerce, MIT, Aug. 10, 2001.

* cited by examiner

SYSTEM AND METHOD FOR RAPID UPDATING OF CREDIT INFORMATION

The present application is a continuation of and claims priority to U.S. patent application Ser. No. 10/163,301, filed on Jun. 7, 2002, entitled "System and Method for Rapid Updating of Credit Information," which claims priority to U.S. Provisional Application No. 60/296,135, filed Jun. 7, 2001. The disclosure of these priority applications are incorporated herein by reference in their entirety to the extent that it is consistent with this invention and application.

BACKGROUND OF THE INVENTION

1. Field of the Invention

The invention relates to the field of electronic transactions, and more particularly to techniques for rapidly updating credit scores or other credit information, for instance on a daily or greater basis.

2. Description of the Related Art

The credit card, mortgage, personal credit and other financial sectors rely on a variety of information in reviewing, approving, denying and otherwise evaluating credit and credit risk.

One commercially known metric for assessing credit risk is the mathematical model generated by Fair, Issac and Company (FICO) which assigns consumers a normative score based on credit files and other information. Credit files themselves, such as those maintained by the credit reporting organizations (such as Equifax and Experian), may receive updated account payment, balance, delinquency and other information on a periodic basis, which is typically monthly. The First Data Resources Corporation (FDR) likewise commercially handles score calculation generally on a monthly basis. One known FDR risk score is based on historical data of a particular credit card account, including daily transaction data for the account. However, the FDR risk score is not based on credit reporting organization data.

Other methods and systems are known which generate credit scores on a monthly basis using bimonthly data from credit reporting organizations and monthly historical data for a particular account.

Financial institutions such as credit card issuers use the credit scores and data to determine whether and to what extent to extend credit to a consumer. Credit card issuers may rely on automated scoring engines which use the credit scores and data to determine to what extent to extend credit to an existing cardholder. In a certain percentage of cases, the credit card issuer, based on the scoring engine, will extend credit to a consumer who then fails to repay the loan. The profit of a credit card issuer is thus affected by the predictive capability of the scoring engine. A scoring engine which reduces the instances of default by even a small percentage can have a significant effect on the profit of the credit card issuer.

BRIEF SUMMARY OF THE INVENTION

According to one embodiment, the invention relates to a system and method for evaluating the creditworthiness of an account holder of a credit account comprising the steps of determining, at least once a day, whether a first data set relating to the creditworthiness of the account holder has been received from a credit reporting organization; determining, at least once a day, whether a second data set relating to transaction activity of the credit account has been received; periodically receiving from a credit reporting organization a third data set relating to the creditworthiness of the account holder; periodically receiving a fourth data set relating to the historical activity of the credit account; and using the first and second data sets, to the extent they have been received, and the third and fourth data sets to determine a measure of creditworthiness.

According to another embodiment, the invention relates to a system and method for determining the creditworthiness of an account holder comprising the steps of receiving a credit history data set from a credit reporting organization on a periodic basis; receiving an account history data set on a periodic basis; determining, at least once a day, whether a third data set relating to the creditworthiness of the account holder has been received; and using the credit history data set, the account history data set, and the third data set to determine a measure of the creditworthiness of the account holder.

The invention can provide significant advantages in predicting credit risk, due in part to: (a) the utilization of data from a credit reporting organization in addition to data from the account holder's historical behavior in a particular account, and (b) the utilization of long-term reports, e.g., a bimonthly credit reporting organization report, and a monthly account history data set, in addition to daily reports, e.g., a daily credit reporting organization report for significant events and a daily account transaction data set for the latest transaction activity. This information allows the risk model to reflect both historical behavior and very recent behavior in the account holder's entire recorded credit behavior, rather than his or her behavior in one account. The risk model can therefore provide a significant improvement in the accuracy of predicting defaults.

DETAILED DESCRIPTION OF THE INVENTION

The present invention relates to a method and system for evaluating creditworthiness. According to one embodiment, the method and system produce, among other things, a score ranging from 0 to 980 which can be used to decide whether and to what degree to extend credit to a consumer. For example, the score may be used to decide whether to authorize a particular credit transaction, whether to approve or change an account holder's credit limit, or what terms to offer in reissuing an account. The score is derived from data relating to the creditworthiness of a particular account holder, which data may be maintained by one or more entities.

Figure 1:
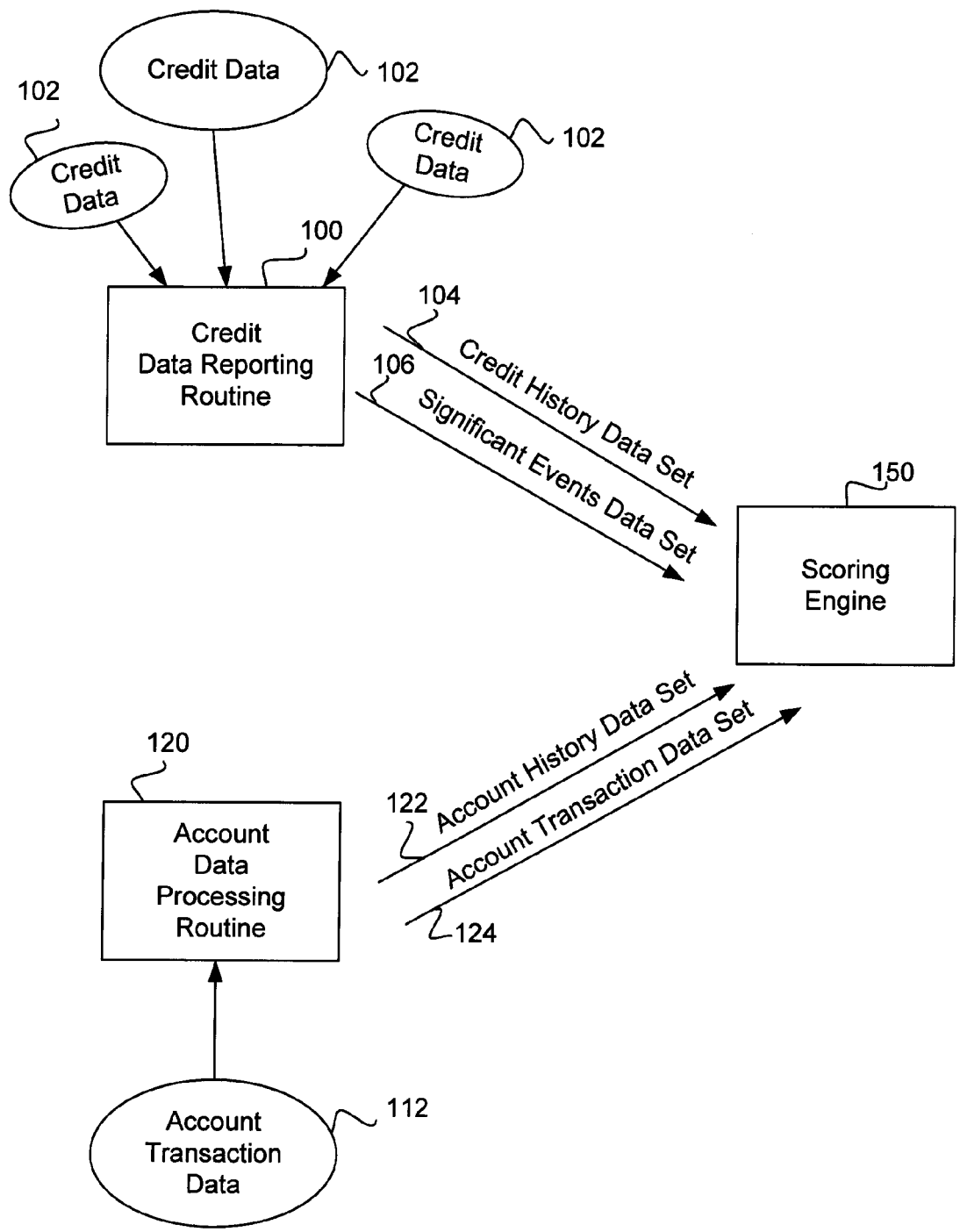
FIG. 1 illustrates a method for evaluating creditworthiness according to one embodiment of the invention.

FIG. 1 is a diagram which illustrates a system and method for evaluating creditworthiness according to one embodiment of the invention. As shown in FIG. 1, the system and method include a scoring engine 150 which outputs a score indicative of creditworthiness. The scoring engine 150 receives data from a credit data reporting routine 100 and an account data processing routine 120. The credit data reporting routine 100 is typically carried out by one or more credit reporting organizations (also sometimes referred to as credit bureaus) such as Experian, TransUnion, and Equifax. The credit reporting organizations have agreements with various creditors under which the creditors provide credit data 102 to the credit reporting organizations relating to the behavior of the creditor's account holders. Such agreements enable the credit reporting organizations to compile credit reports in various forms which include detailed information about the credit behavior of account holders. The credit report for a particular person or entity typically includes data from many credit accounts, e.g., mortgage, auto loan, credit card, school loan, etc.

The credit reporting organizations offer credit reports in a standard format to consumers for a fee. The credit reporting organizations may also provide credit reports in a customized format for creditors such as banks issuing credit cards. For example, as shown in FIG. 1, the credit report generation involves the generation of two customized credit reports, a credit history data set 104 and a significant events data set 106.

As shown in FIG. 1, a second portion of the system and method for evaluating creditworthiness involves an account data processing routine 120. The account data processing routine 120 involves, among other things, receiving account transaction data 112 (e.g., data relating to credit card purchases) from merchants and manipulating or processing the account transaction data 112 into a format which is useful for predicting creditworthiness. For example, as will be described below, the account data processing routine 120 may involve receiving credit card transaction data and generating an account history data set 122 (also sometimes referred to as a "master file"), which may be generated monthly, and an account transactions data set 124, which may be generated daily. The account history data set 122 and the account transactions data set 124 are used as input to the scoring engine 150.

The account data processing routine 120 typically receives account transaction data 112 relevant to a single account, such as a credit card account provided by a bank issuing credit cards. The account transaction data 112 may be supplied, for example, by an entity which processes credit card transactions, commonly referred to as "the acquiring processor."

The account data processing routine 120 may be executed on a computer system maintained by the account provider, e.g., the credit card issuing bank. The credit card issuing bank receives the account transaction data 112 and creates and maintains the account history data set 122 and the account transactions data set 124. However, if desired, these functions may also be handled by a separate account data processing entity. The account data processing entity may be, for example, an entity such as First Data Resources Corporation (FDR) which provides credit and debit card processing services to financial institutions such as banks which issue credit and debit cards.

A third portion of the system and method shown in FIG. 1 for evaluating creditworthiness involves a scoring engine 150 which, as will be described below, includes at least one risk model. The risk model is a routine which typically receives as input a credit history data set 104, a significant events data set 106, an account history data set 122, and an account transactions data set 124, and which outputs a score indicative of creditworthiness from 0 to 980, with 980 being the highest credit risk. However, the risk score can be based on any desired combination of input data sets 104, 106, 122, 124.

Figure 2:
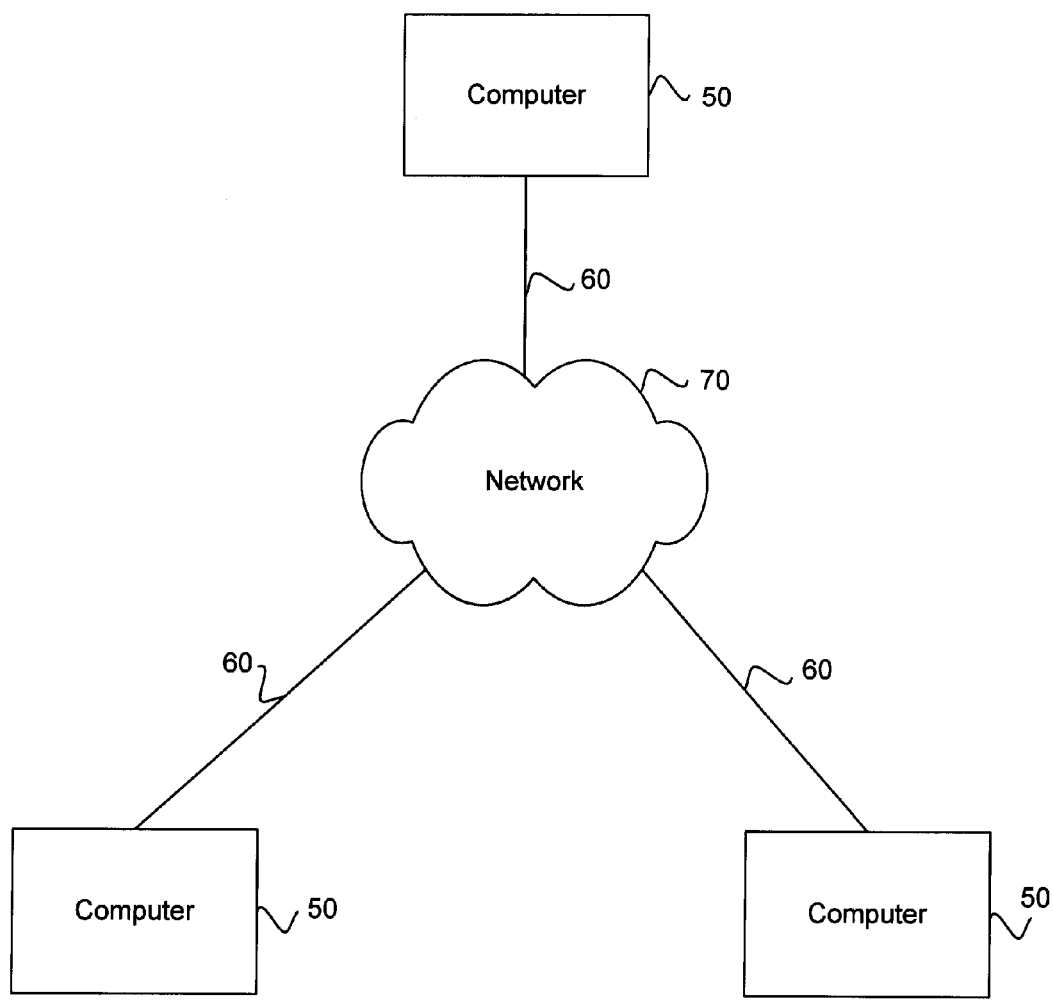
FIG. 2 illustrates an example of a system which can be used to carry out a method according to an exemplary embodiment of the invention.

The processes depicted in FIG. 1 can be carried out on a system as shown in FIG. 2 which includes computers or computing devices 50, such as server computers, connected via a communication links 60 to a network 70 such as the internet. The computers 50 are programmed to exchange information via the network 70. The computers 50 each typically include a database for storing information. Each computer 50 may be adapted to send and receive information to multiple users over a network, as is well known in the art.

The data files which provide input to the scoring engine 150 will now be described with reference to FIG. 1. Typically, the credit history data set 104 and the significant events data set 106 are generated by one or more credit reporting organizations. The account history data set 122 and the account transactions data set 124 may be generated by the financial institution which issues the account, e.g., a credit card issuer, or may be generated by another entity which processes the account information.

The credit history data set 104 typically comprises a borrower-specific file which includes data on the borrower's historical credit behavior. The data are typically derived from multiple creditors and accounts, e.g., mortgage, auto loan, school loan, credit card, etc. Examples of variables which may be included in the credit history data set 104 include: current balance, repayment schedule, lateness history, delinquency, age of account, number of various accounts, open date of various accounts, lateness information, if any, of various accounts, credit limit of various accounts, loan amount of various accounts, etc. The credit history data set 104 is typically transmitted periodically, e.g., every two months, by the credit reporting organization to the entity running the scoring engine 150, e.g., a bank issuing credit cards.

The significant events data set 106 contains data derived from multiple creditors and accounts relating to events which are significant to a person's creditworthiness. For example, the significant events data set 106 may include recent changes in account balance over a certain dollar amount, bankruptcy filing, a delinquency greater than an arbitrary time period, receipt of an arbitrary payment amount, credit inquiries, new account openings, etc.

The significant events data set 106 is typically maintained by a credit reporting organization and may be sent to the entity running the scoring engine 150 on a daily basis in the event that there is a new significant event to report. In the case of no new significant event, the significant event data set 106 is either not delivered or contains a null value representing the absence of a new significant event.

The other two data sets, i.e., the account history data set 122 and the account transactions data set 124 contain data relating to a particular credit account of the account holder. The account history data set 122 may contain a number of variables related to the account activity and characteristics for a particular holder of an account. The account history data set 122 may contain a relatively large amount of data, because the creditor is the entity which provides the account to the account holder and thus has typically maintained detailed records of the account holder and account activity over an extended time period.

Examples of variables which may be included in the account history data set 122 include total transaction dollars, number of transactions, payment amount, lateness, merchant balance, cash balance, balance transfer amount, cardmember service (CMS) calling information (e.g., information on calls made by cardmembers to CMS such as number of calls, time of calls, subject matter of calls), etc. The account history data set 122 may be generated on a monthly basis, for example, and may contain data relevant to the previous 12 months of account activity.

The account transactions data set 124 typically contains data on recent credit card transactions. It contains such information as amount of transaction, merchant, date and time of transaction, location of merchant, type of merchant, available credit at the time, etc. According to one embodiment, the account transactions data set 124 is generated on a daily basis and used as input to the scoring engine 150.

Figure 3:
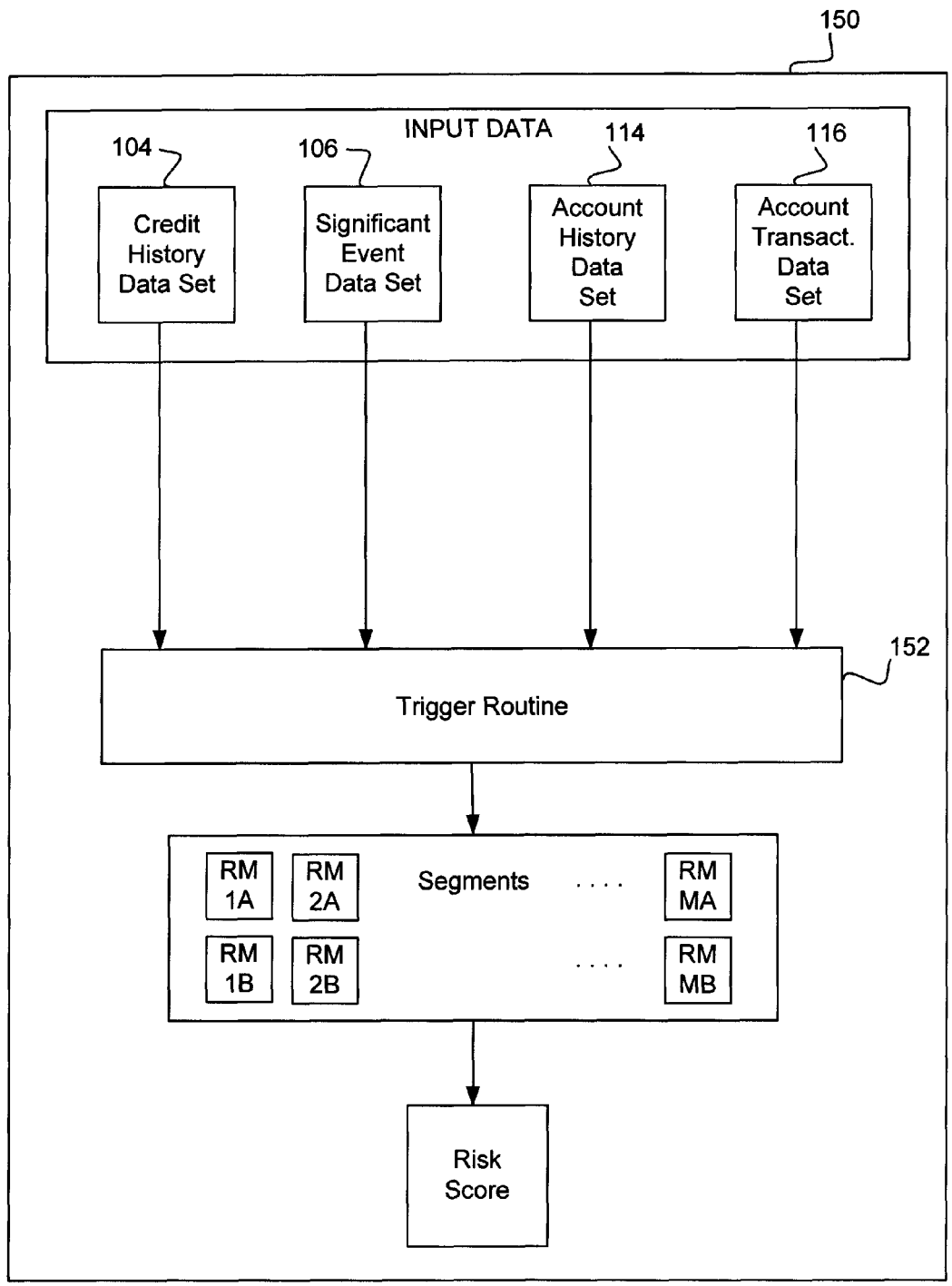
FIG. 3 illustrates a scoring engine which may be used in practicing the method shown in FIG. 1 according to an exemplary embodiment of the invention.

The scoring engine 150, as shown in FIG. 3, receives the input data sets 104, 106, 122 and 124 and outputs a score indicative of the creditworthiness of the account holders. As a preliminary step, a trigger routine 152, as shown in FIG. 3, may be executed to determine whether a particular account needs to be scored. The process of scoring an account has a cost associated with it. For example, if the scoring process is performed by an entity retained for that purpose, the entity will typically charge a fee based on the number of accounts scored. Whether the scoring is performed in-house or by a third party, the computer resources and file transfer process will have an associated cost, which may be avoided by the triggering routine.

According to an exemplary embodiment of the invention, the triggering routine 152 is executed initially to determine whether the account data has changed in such a manner or extent as to justify the cost of scoring a particular account. The triggering routine involves examining one or more variables, typically existing in the significant events data set 106 or the account transactions data set 124. For example, the triggering routine 152 may check these data sets to ascertain whether a payment has been received, a payment reversal has taken place (e.g., a bounced check), an authorization has been granted over a certain dollar amount, a balance change greater than a certain amount has taken place, or one of the events in the significant events file 106 has occurred. The triggering routine may also examine a "cycle" variable in the account history data set 122 which forces the calculation of a score at least once every specified cycle in the event that no other triggers have caused a score to be calculated.

Figure 4:
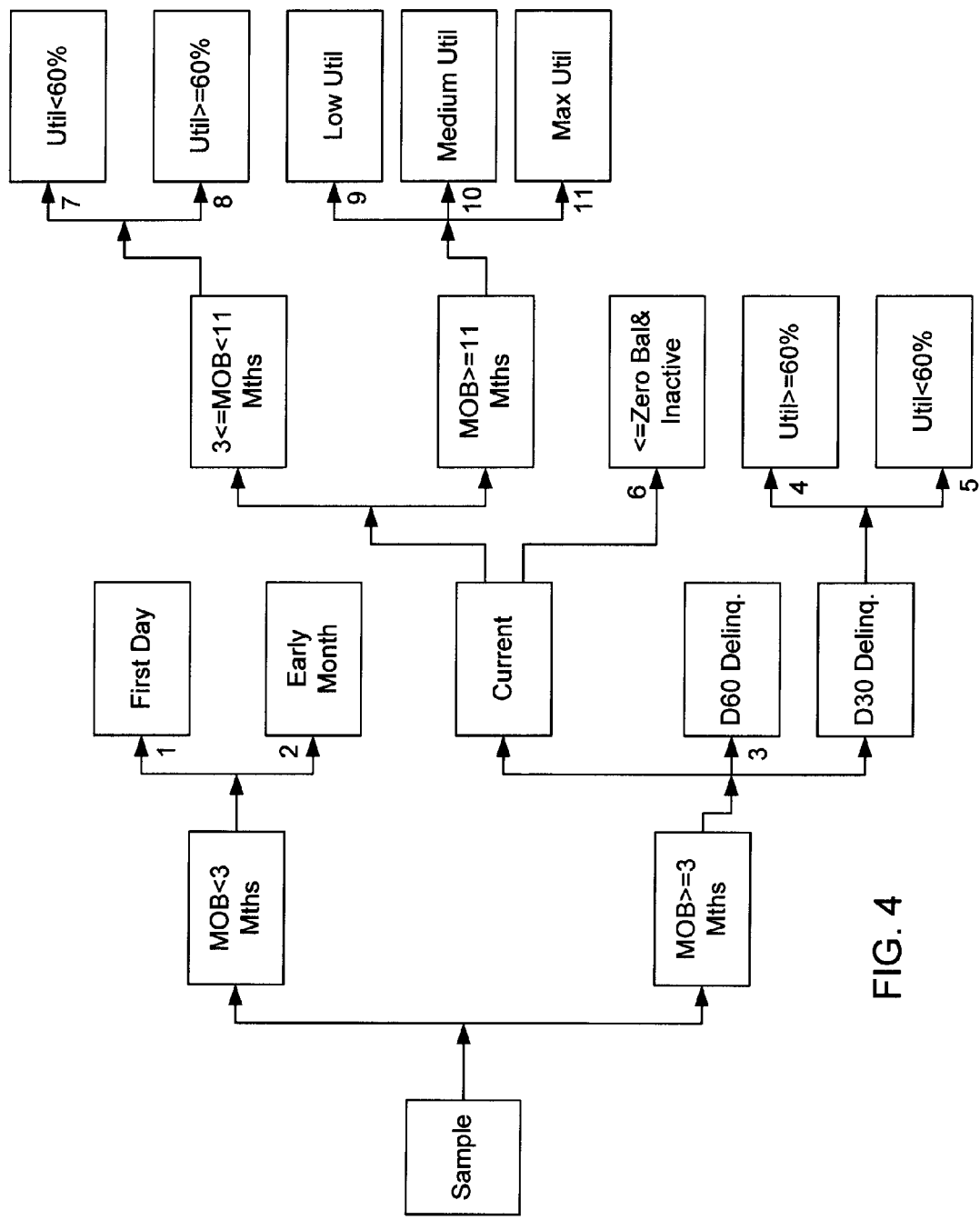
FIG. 4 shows an example of a number of account holder segments which can be used in connection with the scoring engine of FIG. 3 according to an exemplary embodiment of the invention.

To enhance the predictive capability of the scoring engine 150, a number of different risk models may be constructed which correspond to different segments of the account holder population. The segments are defined by the behavior of the account holders. For example, as shown in FIG. 4, the account holder population may be segmented based on the age of the account (i.e., the "Months on Book" or MOB), whether the account is current, delinquent 30 days, or delinquent 60 days, the utilization of the credit line ("Util", which refers to the balance of the account at a specified time divided by the credit limit), and whether the account has a zero balance and is inactive. For relatively new accounts (e.g., Months on Book <3 months), as shown in FIG. 4, a first segment may be defined for first day accounts ("First Day"), and a second segment may be defined for accounts having an age of 2 days through the end of the second month ("Early Month").

After the account holder is classified into a particular segment, the risk model for that segment is utilized to generate a risk score, for example on a scale of 0 to 980. A number of risk models are constructed in order to enhance the predictive capability of the scoring engine. Each risk model is designed to predict risk with respect to a particular segment of the account holder population.

For example, segment 1 may be defined for first day accounts. If credit reporting organization data is not available for a particular account holder, then the score may be based on total first day transactions amount and open-to-buy amount (i.e., credit limit minus total transactions amount). If credit reporting organization data is available, then the number of active accounts (also sometimes referred to as active "trades"), amount of retail accounts, and total revolving accounts balance may also be used for scoring.

The risk models typically take the following form:

$$\text{Score} = \exp(a_1 x_1 + \ldots + a_n x_n) / [1 + \exp(a_1 x_1 + \ldots + a_n x_n)]$$

where the variables $x_1, x_2, \ldots, x_n$ are the parameters discussed above (e.g., total revolving accounts balance, amount of retail accounts, etc.), and the coefficients $a_1, a_2, \ldots, a_n$ are chosen according to desired criteria of the account provider.

Referring again to FIG. 3, each segment may have two risk models associated with it. For example, in FIG. 3, segment 1 has risk models RM 1A and RM 1B, segment 2 has risk models RM 2A and RM 2B, and so on. The first risk model, e.g., RM 1A is constructed to receive as input the credit history data set 104, the significant events data set 106, the account history data set 122, and the account transactions data set 124. The second risk model, e.g., RM 1B, may be constructed for those account holders who have no credit history data set 104 or significant events data set 106, for example because the credit reporting organization has no records of their credit history.

Once the correct segment is ascertained, data from the input data sets is used as input to the scoring engine 150 to calculate a risk score. The risk score is typically based on a significant amount of historical data from the credit history data set 104 and account history data set 122. The risk score is also typically based on very recent data from the significant events data set 106 and the account transactions data set 124. Due to the combination of a significant amount of historical data and very recent data, the risk model is thus able to provide improved accuracy in predicting credit risk. The inclusion of recent data, for example, allows the issuing bank to deny credit to any account exhibiting recent activity indicative of increased credit risk.

Figure 5:
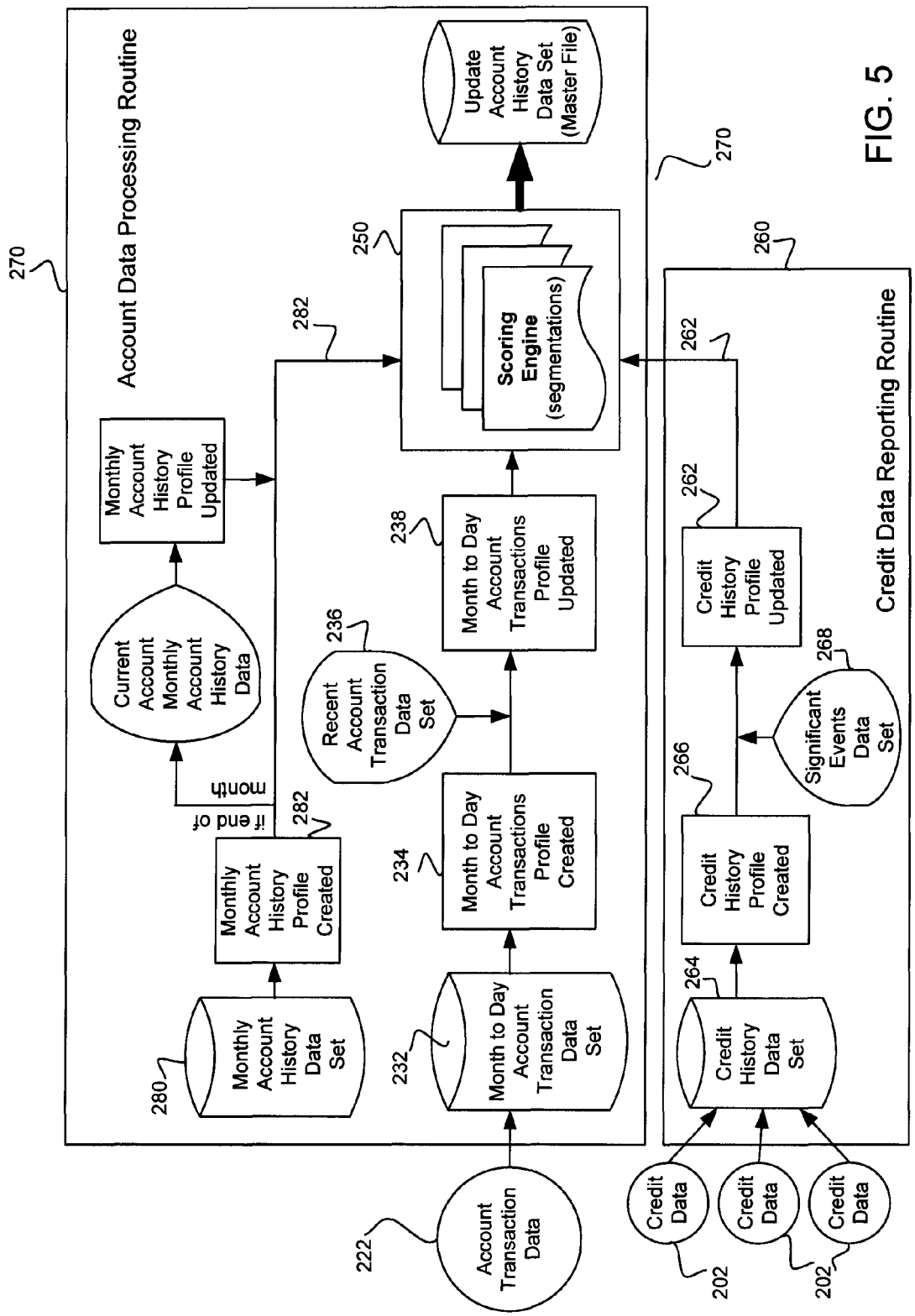
FIG. 5 illustrates a method for evaluating creditworthiness according to another embodiment of the invention.

FIG. 5 is a diagram which illustrates a system and method for evaluating creditworthiness according another embodiment of the invention. As shown in FIG. 5, the system and method include a scoring engine 250 which outputs a score indicative of creditworthiness. The scoring engine 250, which may be part of an account data processing routine 270, receives input data 262 from a credit data reporting routine 260 and receives input data 238, 282 generated in the account data processing routine 270.

The credit data reporting routine 260 provides data 262 relating to the credit history and creditworthiness of the account holder. The credit data reporting routine 260 may be executed by a credit reporting organization, for example, which provides a customized data set to the issuing bank. The account data processing routine 270 processes historical data for the particular accounts of the account provider (e.g., the bank issuing credit cards). The account data processing routine 270 may be executed by a credit card issuing bank, for example, or it may be executed by a separate processing entity which the credit card issuing bank retains to process the account transactions of the bank's account holders.

The scoring engine 250 includes at least one risk model, and typically includes a number of risk models corresponding to a number of segments of the account holder population, as described above with reference to FIG. 4. The functions and processes depicted in FIG. 5 can be carried out on the system shown in FIG. 2. The process of generating the files 262, 238, 282 which are input to the scoring engine 250 will now be described with reference to FIG. 5.

The credit reporting organization receives credit data 202 relevant to particular borrowers from a number of creditors which have agreements with the credit reporting organization to provide such data. The credit reporting organization uses the credit data 202 to create a credit history data set 264 on a periodic basis, for example monthly. The credit history data set 264 typically contains the same variables described above with respect to the credit history data set 104.

The next step in the credit data reporting routine 260 involves the creation of a credit history profile 266 from the credit history data set 264. The credit history profile 266 summarizes the data in the credit history data set 264 using a set of derived variables called profilers. The profilers are generated from the credit history data set 264 using weight functions or ratios. Each profiler routine comprises an algorithm which takes as input certain variables of the credit history data set 264 and which outputs a real number. For example, "debt burden ratio" is an example of a profiler, defined as the total revolving balance divided by the highest bankcard credit line limit. Another example of a profiler is the "average revolving balance velocity," which may be defined as total credit balance divided by the average age of bankcard accounts. The profilers can be constructed according any desired criteria of the account provider.

In general, the profilers summarize the data in the credit history data set 264 and therefore can be updated with current data using less computer resources than would be required to update the credit history data set 264, which may be a relatively large file. Consequently, the profilers facilitate the transmission of updated credit history data to the scoring engine 250 at a relatively high frequency, e.g., daily.

In the next step of the credit data reporting routine 260, the credit reporting organization reports significant events in a significant events data set 268. The significant events data set 268 contains data derived from multiple creditors and accounts relating to events which are significant to a person's creditworthiness. For example, the significant events data set 268 may include changes in account balance over a certain dollar amount, bankruptcy filing, a delinquency greater than an arbitrary time period, receipt of an arbitrary payment amount, lateness, inquiries, etc. The significant events data set 260 typically contains the same variables described above with respect to data set 106.

The significant events data set 268 is used to update the credit history profile 266. The credit history profile 266 is updated by applying a weight function to the significant events data set 268 and to the previous credit history profile 266. The updated credit history profile 262 thus is based in part on recent, e.g., daily, data relating to significant events in the credit history of the account holders. The updated credit history profile 262 is used as input to the scoring engine 250.

Referring now to the account data processing routine 270, that routine involves, among other things, receiving account transaction data 222 (e.g., data relating to credit card purchases) from merchants, typically via an acquiring processor, and manipulating or processing the account transaction data 222 into a format which is useful for predicting creditworthiness. The account data processing routine 270 generates an account history profile 282 on a periodic basis, e.g., monthly, and an updated account transactions profile 238 on a periodic basis, e.g., daily, which are input to the scoring engine 250.

The account transaction data 222 received by the account data processing routine 270 typically comprises data on transactions of only the accounts provided by the account provider running the scoring engine 250. For example, the account transaction data 222 may comprise data on transactions executed by the card holders of an issuing bank's credit cards.

The account transaction data 222 may be supplied, for example, by one or more entities which processes credit card transactions, such as one or more acquiring processors. The entity which runs the account data processing routine 270 uses the account transaction data 222 to create an account transactions data set 232 which contains relatively recent data on account transactions. The account transactions data set 232 typically contains the same variables described above with respect to account transactions data set 124.

Another step in the account data processing routine 270 involves the creation of an account transactions profile 234 from the account transactions data set 232. The account transactions profile 234 summarizes the data in the account transactions data set 232 using a set of derived variables called profilers, as described above. The profilers may be generated from the account transactions data set 232 using weight functions. Each profiler routine comprises an algorithm which takes as input certain variables of the account transactions data set 232 and which outputs a real number. The profilers summarize the data in the account transactions data set 232 and therefore can be updated with current data using less computer resources than would be required to update the account transactions data set 232, which may be typically a relatively large file. Consequently, the profilers facilitate the transmission of updated account transactions data to the scoring engine 250 at a relatively high frequency, e.g., daily. As described above, the profilers for the account data processing routine 270 can be constructed according any desired criteria of the account provider.

In another step of the account data processing routine 270, a recent account transactions data set 236 is received from one or more acquiring processors and used to update the account transactions profile 234. The recent account transactions data set 236 contains data relevant to recently executed credit card transactions, such as amount of transaction, date and time of transaction, merchant, location of merchant, type of merchant, available credit at the time, etc.

The account transactions profile 234 is updated by applying a weight function to the recent account transactions data 236 and the previous account transactions profile 234. The updated account transactions profile 238 thus is based in part on recent, e.g., daily, data relating to account transactions. The updated account transactions profile 238 is used as input to the scoring engine 250.

FIG. 5 also shows that the account data processing routine 270 periodically (e.g., monthly) generates an account history data set 280 (also known as a "master file") which contains a relatively large number of variables relating to historical activity of the account. The account history data set 280 typically contains the same variables described above with respect to account history data set 122.

The account history data set 280 typically comprises data spanning 12 months, and may be structured as 12 monthly data sets, for example. The account history data set 280 is used to create an account history profile 282 using a number of profiler routines, as described above in connection with the account transactions profile 234. The account history profile 282 is used as input to the scoring engine 250.

If the account data processing routine 270 is being executed at the end of the month, at which time a new entire month of account history data is available, the account history profile 282 is updated with the newly available account history data, as shown in the upper portion of FIG. 5.

The input data to the scoring engine 250 includes the account history profile 282, the account transaction profile 238, and the updated credit history profile 262. As a preliminary step, a trigger routine may be executed to determine whether a particular account needs to be scored, as described above with respect to FIG. 3. For the accounts which trigger scoring, the profilers are the input to the scoring engine 250. As described above, the scoring engine 250 typically includes a number of account holder segments, such as those shown in FIG. 4. The various segments include risk models which are customized for the particular characteristics of the segment population in order to enhance the predictive capabilities of the scoring engine 250. Each segment may have two risk models, a first risk model which receives the account transactions profile 238, the account history profile 282, and the credit history profile 262, and a second risk model which receives only the account transaction profile 238 and the account history profile 282, e.g., because the credit reporting organization has no data on the account holder.

As described above, the risk model is typically of the form:

$$\text{Score}=\exp(a_1x_1+\ldots+a_nx_n)/[1+\exp(a_1x_1+\ldots+a_nx_n)]$$

where the variables $x_1, x_2, \ldots x_n$ are the profilers discussed above and the coefficients $a_1, a_2, \ldots, a_n$ are chosen according to desired criteria of the account provider.

After the scoring engine 250 has scored the accounts, the account history data set 280 is updated, as shown on the right side of FIG. 5. This update typically involves updating only the latest month of account history data in the account history data set 280.

According to another aspect of the invention, a feature known as a "mimic routine" or "mimic algorithm" may be applied to data in the account history data set 280 according to an exemplary embodiment of the invention. The account history data set 280 enhances the predictive capability of the scoring engine 250 because, among other things, it typically includes data spanning a 12-month period. However, because it is typically a relatively large file, the data processing resources required to process the account history data set 280 on a daily basis can be large.

Accordingly, the inventors have developed mimic routines which produce a single value representative of a plurality of historical values for a particular variable in the account history data set 280. The mimic routines typically have the form of a weighted average:

$$M=1/n(a_1x_1+a_2x_2+a_3x_3+\ldots+a_nx_n)$$

where the coefficients $a_n$ represent the weighting factors and the $x_n$ represent the file variables from the account history data set 280. Typically, the most recent month is weighted more heavily than the oldest month. The mimic routines are used in connection with the process of creating and updating the account history profile 282 with the profiler routines. For example, a mimic routine may comprise a portion of a profiler routine.

The mimic routines generally have two forms. The first form converts a plurality of historical values of a particular variable from the account history data set 280 into a single value representative of the entire time span. For example, a mimic routine may take as input 12 monthly values of a account history data set variable and output a single value representative of the 12 monthly values. This process may be repeated for any desired variables in the account history data set 280. The first form is applied initially to data in the account history data set 280 to derive a single value for desired variables having multiple historical values, e.g., 12 monthly values.

One example of the first form of mimic routine relates to a weighted average of the monthly balance amounts. For example, the account history data set 280 may include the monthly balance values Bal(1), Bal(2), . . . , Bal(12). A mimic routine may be defined to calculate an "avgbal(12)" variable as follows:

$$\text{avgbal}(12)=a_1*\text{Bal}(1)+a_2*\text{Bal}(2)+\ldots+a_{12}*\text{Bal}(12)$$

where the coefficients $a_1, a_2, \ldots, a_{12}$ are selected according to any desired criteria, e.g., to maximize the predictive power of avgbal(12).

The second form of mimic routine is used to update a previous output value from a mimic routine based on a new value in a new account history data set 280. In particular, the second form of mimic routine receives two inputs, (1) the output from a previously executed mimic routine, and (2) a new account history data set 280 variable. The second form of mimic routine may also utilize a weighted average of the two values, or other desired equation, to update the output of the mimic routine. According to one example, a mimic routine "avgbal" for month n+1 (the new month) is defined as:

$$\text{avgbal}(n+1)=a*\text{avgbal}(n)+(1-a)*\text{bal}(n+1)$$

where a is the desired weighting factor.

The second form of mimic routine provides the advantage that the previous output of any mimic routine can be easily updated. Thus, initially, the first form of mimic routine may be applied to a number of historical values of a variable in the account history data set 280 to output a single value representative of all the historical values. Next, when a new account history data set 280 is received, e.g., in one month, the second form of mimic routine is used to update the output with the new value from the new account history data set 280.

Besides the two aforementioned general forms of mimic routines, mimic routines may also be used to mimic moving summations and moving maxima/minima, e.g., sum of cash advance in past 12 months, the total number of late fees charged in the past 24 months, the maximum balance in the last 12 months, etc.). These moving sum and moving maxima/minima typically can have significant power in predicting credit risk. The mimic algorithms simulate the moving sum and moving maxima/minima without the need to store all the time series data. The moving summation and moving maxima/minima type of mimic algorithms may be used, for example, as a part of a profiler in the process of creating the account history profile 282.

An example of a summation-type mimic algorithm will now be described. The objective of this exemplary mimic algorithm is to determine SX(t), which is an estimate of (i.e., mimics) SUMX(t). SUMX(t) is defined as:

$$\text{SUM}X(t)=\text{sum}(X(t)+X(t-1)+\ldots+X(t-n))$$

where X(t) is the balance at month t. The objective is to calculate SX(t+1) without carrying the variables for the previous n months, as would be required to calculate SUMX. The algorithm involves defining Y(n,t)=X(t−n), which is an estimate of the balance X for the oldest month t−n. SX(t+1) can be determined as follows:

$$SX(t+1)=SX(t)+X(t+1)-Y(t)$$

Y(t) is determined from the following equation:

$$Y(t+1)=a*Y(t)+(1-a)*X(t+1)$$

wherein the factor a=1−1/n. The mimic algorithm thus allows SX, which mimics SUMX, to be calculated without carrying the variables for the previous n months. The value for SX can then be used as part of a profiler, for example to create the account history profile 282.

The risk score output by the risk model is used as a basis for making decisions relating to the extension of credit, such as whether to change an account holder's credit line, whether to authorize a particular credit card transaction, and how to define the terms of new credit accounts in marketing them to prospective account holders. The invention provides significant advantages in predicting credit risk, due in part to: (a) the utilization of data from a credit reporting organization in addition to data from the account holder's historical behavior in a particular account, and (b) the utilization of long-term reports, e.g., a bimonthly credit reporting organization report, and a monthly account history data set, in addition to daily reports, e.g., a daily credit reporting organization report for significant events and a daily account transaction data set for the latest transaction activity. This information allows the risk model to reflect both historical behavior and very recent behavior in the account holder's entire recorded credit behavior, rather than his or her behavior in one account. The risk model can therefore provide a significant improvement in the accuracy of predicting defaults.

Figure 6:
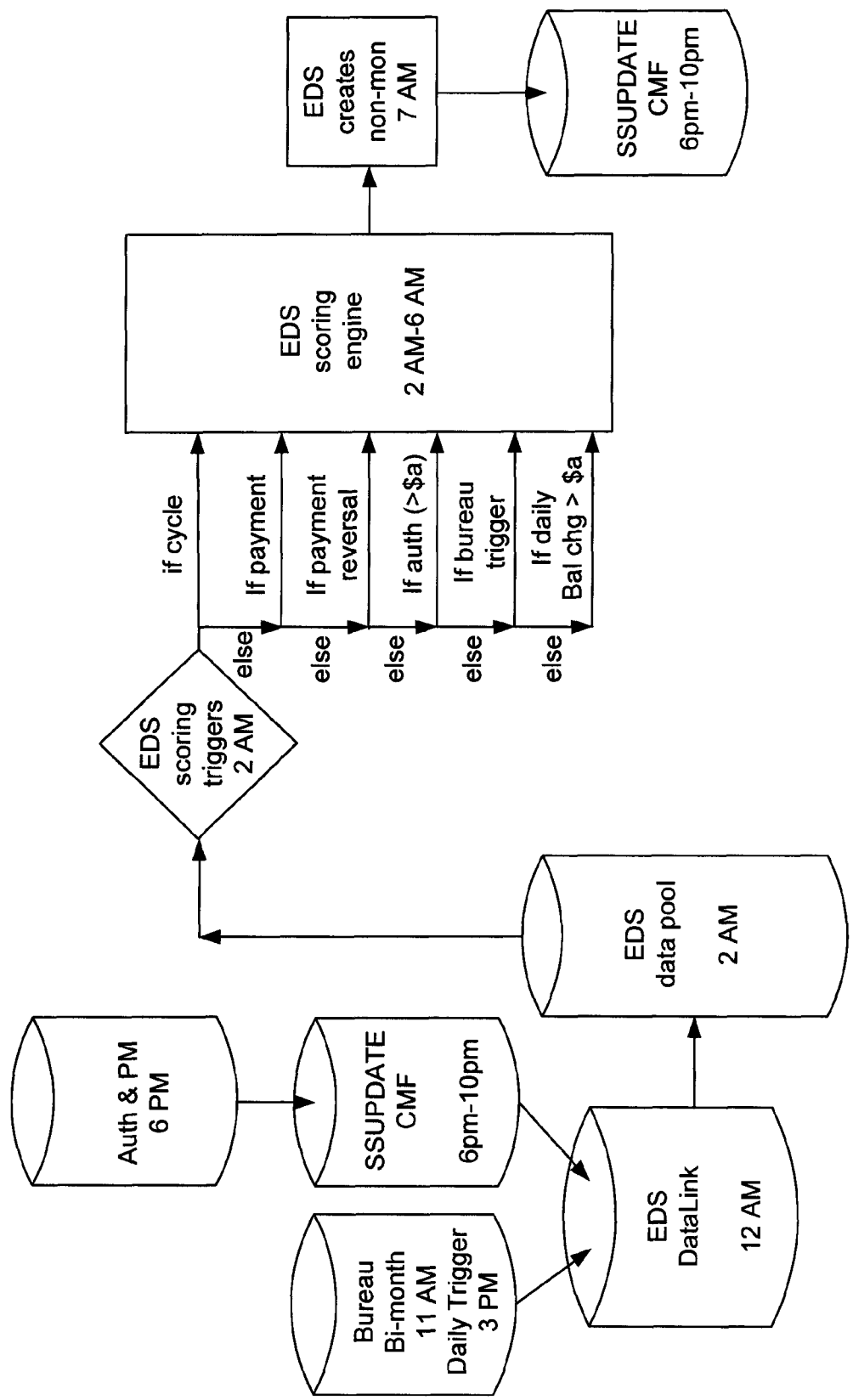
FIG. 6 shows an example of the timing of data processing according to an exemplary embodiment of the invention.

FIG. 6 illustrates an example of the timing of a daily calculation according to an exemplary embodiment of the invention. As shown in FIG. 6, Authorization ("Auth") data from authorized credit card transactions and posted monetary ("PM") data are received at 6 pm by a routine which updates the account history data set (also sometimes referred to as the cardholder master file (CMF)). At 11 am, the credit history data set (e.g., "bureau bi-month") is received, and at 3 pm the significant events data set (e.g., "daily trigger") is received. All the data is held until 2 am, at which time triggers are evaluated to determine which accounts should be scored. The accounts which have been triggered for scoring are scored from 2 am to 6 am. Thus, by 6 am, an up to date score is obtained for evaluation of whether and to what extent to extend credit to each account.

While the foregoing description includes details and specific examples, it is to be understood that these have been included for purposes of illustration only, and are not to be interpreted as limitations of the present invention. Modifications to the embodiments described above can be made without departing from the spirit and scope of the invention, which is intended to be encompassed by the following claims and their legal equivalents.

What is claimed is:

1. A computer implemented method for evaluating current creditworthiness of a current account holder of an account comprising:
   determining periodically, by at least one computer processor, whether a first data set relating to the current creditworthiness of the current account holder has been received from an organization;
   determining periodically, by the at least one computer processor, whether a second data set relating to transaction activity of the account has been received;
   receiving periodically, by the at least one computer processor, from the organization, a third data set relating to the creditworthiness of the account holder;
   receiving periodically, by the at least one computer processor, a fourth data set relating to the historical activity of the account;
   analyzing, by the at least one computer processor, the first, second, third, and fourth data sets, to the extent they have been received, to determine the presence of a requirement for calculating a measure of creditworthiness, wherein the requirement is based on at least one triggering event; and
   using the first and second data sets, by the at least one computer processor, to the extent they have been received, and the third and fourth data sets, to periodically determine the measure of creditworthiness based on the requirement;
   wherein the at least one computer processor is located in at least one computing device that is communicatively coupled to a network.

2. The method of claim 1, wherein the first and second data sets are received at least weekly, and third data set is received at least bi-monthly, and the fourth data set is received monthly.

3. The method of claim 1, further comprising:
   defining, by the at least one computer processor, a plurality of account holder segments based on at least one characteristic of the account holders;
   defining, by the at least one computer processor, at least one risk model for each of the plurality of account holder segments; and
   determining a subsequent measure of creditworthiness based on the at least one risk model associated with the plurality of account holder segments by calculating a risk score.

4. The method of claim 1, wherein the triggering event comprises one of: (a) a receipt of payment, (b) a transaction greater than a predetermined amount, or (c) any event reported in the first data set.

5. The method of claim 1, further comprising:
   creating, by the at least one computer processor, an account transactions profile based on the second data set;
   creating, by the at least one computer processor, a credit history profile based on the third data set;
   creating, by the at least one computer processor, an account history profile based on the fourth data set; and
   inputting, by the at least one computer processor, the account transactions profile, the credit history profile, and the account history profile into a scoring engine to determine the measure of creditworthiness.

6. The method of claim 1, further comprising:
   representing, by the at least one computer processor, a plurality of values in the fourth data set as a single value; and
   using, by the at least one computer processor, the single value in determining the measure of creditworthiness.

7. The method of claim 6, wherein the step of representing is carried out using a weighted average.

8. The method of claim 1, wherein the organization is a credit reporting organization.

9. The method of claim 1, wherein the account is a credit account.

10. A computer implemented system for evaluating current creditworthiness of a current account holder of an account comprising:
    a computer based network;
    at least one server, wherein the at least one server is communicatively coupled to the computer based network and the at least one server comprises:
       means for determining, periodically, whether a first data set relating to the current creditworthiness of the current account holder has been received from an organization;
       means for determining, periodically, whether a second data set relating to transaction activity of the account has been received;
       means for receiving, periodically, from the organization a third data set relating to the creditworthiness of the account holder;
       means for receiving, periodically, a fourth data set relating to the historical activity of the account;

means for analyzing the first, second, third, and fourth data sets, to the extent they have been received, to determine the presence of a requirement for calculating a measure of creditworthiness, wherein the requirement is based on at least one triggering event; and means for determining, periodically, a measure of the creditworthiness using the first and second data sets, to the extent they have been received, and the third and fourth data sets.

11. The computer implemented system of claim 10, further comprising:

means for defining a plurality of account holder segments based on at least one characteristic of the account holders;

means for defining at least one risk model for each of the plurality of account holder segments; and means for determining a subsequent measure of creditworthiness based on the at least one risk model associated with the plurality of account holder segments by calculating a risk score.

12. The method of claim 10, wherein the triggering event comprises one of: a receipt of payment, a transaction greater than a predetermined amount, or any event reported in the first data set.

13. The method of claim 10, wherein the organization is a credit reporting organization.

14. The method of claim 10, wherein the account is a credit account.

15. A computer implemented method for evaluating current creditworthiness of a current account holder of a credit account comprising:

determining periodically, by at least one computer processor, whether a first data set relating to the current creditworthiness of the current account holder has been received from a credit reporting organization;

determining periodically, by the at least one computer processor, whether a second data set relating to transaction activity of the credit account has been received;

receiving periodically, by the at least one computer processor, from the credit reporting organization, a third data set relating to the creditworthiness of the current account holder;

receiving periodically, by the at least one computer processor, a fourth data set relating to the historical activity of the credit account;

wherein the first and second data sets are received at least weekly, and third data set is received at least bi-monthly, and the fourth data set is received monthly;

analyzing, by the at least one computer processor, the first, second, third, and fourth data sets, to the extent they have been received, to determine the presence of a requirement for calculating a measure of creditworthiness, wherein the requirement is based on at least one triggering event that comprises one of: a receipt of payment, a transaction greater than a predetermined amount, or any event reported in the first data set;

using the first and second data sets, by the at least one computer processor, to the extent they have been received, and the third and fourth data sets, to periodically determine the measure of creditworthiness based on the requirement;

defining, by the at least one computer processor, a plurality of account holder segments based on at least one characteristic of the account holders of each of the plurality of account holder segments;

defining, by the at least one computer processor, at least one risk model for each of the plurality of account holder segments; and determining a subsequent measure of creditworthiness based on the at least one risk model associated with the plurality of account holder segments by calculating a risk score;

wherein the at least one computer processor is located in at least one computing device that is communicatively coupled to a network.

16. The method of claim 15, further comprising:

creating, by the at least one computer processor, an account transactions profile based on the second data set;

creating, by the at least one computer processor, a credit history profile based on the third data set;

creating, by the at least one computer processor, an account history profile based on the fourth data set; and inputting the account transactions profile, the credit history profile, and the account history profile into a scoring engine to determine the measure of creditworthiness.

17. The method of claim 15, further comprising:

representing, using a weighted average, a plurality of values in the fourth data set as a single value; and using the single value in determining the measure of creditworthiness.

\* \* \* \* \*